(12) United States Patent
Suh

(10) Patent No.: US 9,154,818 B2
(45) Date of Patent: Oct. 6, 2015

(54) METHOD OF PROCESSING NON-REAL TIME SERVICE AND BROADCAST RECEIVER

(75) Inventor: Jong Yeul Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

(21) Appl. No.: 13/636,529

(22) PCT Filed: Mar. 29, 2011

(86) PCT No.: PCT/KR2011/002164
§ 371 (c)(1),
(2), (4) Date: Sep. 21, 2012

(87) PCT Pub. No.: WO2011/122838
PCT Pub. Date: Oct. 6, 2011

(65) Prior Publication Data
US 2013/0014202 A1  Jan. 10, 2013

Related U.S. Application Data

(60) Provisional application No. 61/318,385, filed on Mar. 29, 2010, provisional application No. 61/334,590, filed on May 14, 2010.

(51) Int. Cl.
*H04N 21/858* (2011.01)
*H04N 21/2362* (2011.01)
*H04H 20/93* (2008.01)
*H04H 60/72* (2008.01)

(52) U.S. Cl.
CPC ........... *H04N 21/2362* (2013.01); *H04H 20/93* (2013.01); *H04N 21/8583* (2013.01); *H04H 60/72* (2013.01); *H04H 2201/16* (2013.01)

(58) Field of Classification Search
CPC .......... H04N 21/2362; H04N 21/4348; H04N 21/4622; H04N 21/6175; H04N 21/8586; H04N 21/8583; H04N 60/72; H04N 20/83
USPC ......... 725/34, 68, 70–71, 116, 131, 138, 139, 725/146, 151; 709/217, 227–229, 231
See application file for complete search history.

(56) References Cited

U.S. PATENT DOCUMENTS

| 2006/0248090 A1 | 11/2006 | Bennett et al. |
| 2007/0086465 A1 | 4/2007 | Paila et al. |
| 2009/0320087 A1 | 12/2009 | Song et al. |

(Continued)

FOREIGN PATENT DOCUMENTS

WO   WO 2010090162 A1 * 8/2010

*Primary Examiner* — Hai V Tran
(74) *Attorney, Agent, or Firm* — Denton US LLP

(57) ABSTRACT

A method of processing a non-real time (NRT) service in a broadcast receiver is disclosed where the method includes receiving signaling information including the NRT service information and access information which indicates files of a content item can be accessed by Internet, receiving File Delivery over Unidirectional Transport (FLUTE) files through a FLUTE session, wherein File Delivery Table (FDT) instance of the FLUTE session for each file belonging to the content item includes information for content location of the file, the information for content location including an Uniform Resource Locator (URL), and providing the NRT service using the files belonging to the content item, wherein the files are accessed through the Internet using the URL indicated in the information for content location of the file or accessed through a storage in the broadcast receiver.

16 Claims, 33 Drawing Sheets

(56) References Cited

U.S. PATENT DOCUMENTS

2010/0034140 A1* 2/2010 Song et al. .................. 370/328
2010/0050217 A1   2/2010 Suh et al.
2010/0134701 A1* 6/2010 Eyer ............................. 348/731
2010/0309387 A1* 12/2010 Eyer ............................. 348/731
2011/0289542 A1* 11/2011 Kitazato et al. .............. 725/115

* cited by examiner

Fig. 4

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     transport_stream_id | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

Fig. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

Fig. 6

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05 | ATSC_nrt_service – The virtual channel carries a NRT service conforming to ATSC standards, but no video of stream_type 0x02 or audio of stream_type 0x81 |
| 0x06-0x3F | [Reserved for future ATSC use] |

Fig. 7

| Syntax | No. of Bits | Format |
|---|---|---|
| data_service_table_bytes() { | | |
|   sdf_protocol_version | 8 | uimsbf |
|   application_count_in_section | 8 | uimsbf |
|   if(application_count_in_section > 0) { | | |
|     for(j = 0; j <application_count_in_section; j++) { | | |
|       compatibility_descriptor() | | |
|       app_id_byte_length | 16 | uimsbf |
|       if(app_id_byte_length > 1) { | | |
|         app_id_description | 16 | uimsbf |
|         for(i=0;i<app_id_byte_length-2;i++) { | | |
|           app_id_byte | 8 | bslbf |
|         } | | |
|       } | | |
|       tap_count | 8 | uimsbf |
|       for(i=0;i<tap_count; i++) { | | |
|         protocol_encapsulation | 8 | uimsbf |
|         action_type | 7 | uimsbf |
|         resource_location | 1 | bslbf |
|         Tap() | | |
|         tap_info_length | 16 | uimsbf |
|         for(k=0; k<N; k++) { | | |
|           descriptor() | | |
|         } | | |
|       } | | |
|       app_info_length | 16 | uimsbf |
|       for(i=0; i<M; i++) { | | |
|         descriptor() | | |
|       } | | |
|       app_data_length | 16 | uimsbf |
|       for(i=0; i<app_data_length; i++) { | | |
|         app_data_byte | 8 | bslbf |
|       } | | |
|     } | | |
|   } | | |
|   service_info_length | 16 | uimsbf |
|   for(j=0; j<K; j++) | | |
|     descriptor() | | |
|   } | | |
|   service_private_data_length | 16 | uimsbf |
|   for(j=0; j<service_private_data_length; j++){ | | |
|     service_private_data_byte | 8 | bslbf |
|   } | | |
| } | | |

Fig. 10

| Value | Application Identifier Format |
|---|---|
| 0x0000 | DASE application |
| 0x0004-0x7FFF | ATSC reserved |
| 0x8000-0xFFFF | User private |

Fig. 11

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

Fig. 12

| Syntax | No. of Bits | Format |
|---|---|---|
| NRT_service_signaling_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension | 16 | uimsbf |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     NRT_service_signaling_data() | * | |
| } | | |

Fig. 13

| Syntax | No. of Bits | Format |
|---|---|---|
| NRT_service_map_table_section() { | | |
|     table_id | 8 | 0xDB |
|     section_syntax_indicator | 1 | '0' |
|     private_indicator | 1 | '1' |
|     reserved | 2 | '11' |
|     section_length | 12 | uimsbf |
|     table_id_extension { | | |
|         NST_protocol_version | 8 | uimsbf |
|         reserved | 8 | uimsbf |
|     } | | |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     reserved | 4 | '1111' |
|     major_channel_number | 10 | uimsbf |
|     minor_channel_number | 10 | uimsbf |
|     carrier_frequency | 32 | uimsbf |
|     num_NRT_services | 8 | uimsbf |
|     for (i=0; i<num_NRT_services; i++) | | |
|     { | | |
|         reserved | 4 | '1111' |
|         NRT_service_status | 2 | uimsbf |
|         SP_indicator | 1 | bslbf |
|         CP_indicator | 1 | bslbf |
|         NRT_service_id | 16 | uimsbf |
|         short_NRT_service_name | 8*8 | |
|         reserved | 2 | '11' |
|         NRT_service_category | 6 | uimsbf |
|         num_components | 5 | uimsbf |
|         IP_version_flag | 1 | bslbf |
|         source_IP_address_flag | 1 | bslbf |
|         NRT_service_destination_IP_address_flag | 1 | bslbf |
|         if (source_IP_address_flag) | | |
|             source_IP_address | 32 or 128 | uimsbf |
|         if (NRT_service_destination_IP_address_flag) | | |
|             NRT_service_destination_IP_address | 32 or 128 | uimsbf |

Fig. 14

| | | |
|---|---|---|
| for (j=0; j<num_components; j++) | | |
| { | | |
|     reserved | 1 | '1' |
|     essential_component_indicator | 1 | bslbf |
|     component_destination_IP_address_flag | 1 | bslbf |
|     port_num_count | 5 | uimsbf |
|     component_destination_UDP_port_num | 16 | uimsbf |
|     if (component_destination_IP_address_flag) | | |
|         component_destination_IP_address | 32 or 128 | uimsbf |
|     reserved | 4 | '1111' |
|     num_component_level_descriptors | 4 | uimsbf |
|     for (k=0; k<num_component_level_descriptors; k++) | | |
|     { | | |
|         component_level_descriptor() | var | |
|     } | | |
| { | | |
| reserved | 4 | '1111' |
| num_NRT_service_level_descriptors | 4 | uimsbf |
| for (m=0; m<num_MH_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
| virtual_channel_level_descriptor() | var | |
| } | | |
| } | | |

Fig. 15

| service_category | Meaning |
|---|---|
| 0x00 | [Reserved] |
| 0x0E | Interface of NRT_OMA_DCD_channel_discovery – OMA DCD-3 and delivers Channel Discovery Information of OMA DCD. |
| 0x0F | Interface of NRT_OMA_DCD_content_delivery and delivers the Content of OMA DCD in Broadcast format. |
| 0x10 | NRT_SG_data_service – The M/H Service carries (Electronic) Service Guide data |
| 0x11 – 0x3F | [Reserved for future ATSC use] |

Fig. 16

| Syntax | No. of Bits | Format |
|---|---|---|
| MH_component_descriptor() { | | |
|     descriptor_tag | 8 | 0x8D |
|     descriptor_length | 8 | uimsbf |
|     component_type | 7 | uimsbf |
|     component_encryption_flag | 1 | bsblf |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     MH_component_data(component_type) | var | |
| } | | |

Fig. 17

| component_type | Meaning |
|---|---|
| 0-34 | Assigned or reserved by IANA, except that 20-24, 27, and 29-30 are unassigned |
| 35 | H.264/AVC video stream component (assigned by ATSC for M/H use) |
| 36 | SVC enhancement layer stream component (assigned by ATSC for M/H use) |
| 37 | HE AAC v2 audio stream component (assigned by ATSC for M/H use) |
| 38 | FLUTE file delivery session (assigned by ATSC for M/H use) |
| 39 | STKM stream component (assigned by ATSC for M/H use) |
| 40 | LTKM stream component (assigned by ATSC for M/H use) |
| 41 | OMA-RME DIMS stream component (assigned by ATSC for M/H use) |
| 42 | NTP timebase stream component (assigned by ATSC for M/H use) |
| 43 – 71 | [Unassigned by IANA and reserved by ATSC for possible future M/H use] |
| 72-76 | Reserved by IANA |
| 77-95 | Unassigned by IANA |
| 96-127 | Designated by IANA for dynamic use |

Fig. 18

| Syntax | No. of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if(component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_data(component_type) | var | |
| } | | |

Fig. 19

| Syntax | No.of Bits | Format |
|---|---|---|
| NRT_component_data() { | | |
|    TSI | 16 | uimsbf |
|    session_start_time | 32 | uimsbf |
|    session_end_time | 32 | uimsbf |
|    reserved | 5 | '11111' |
|    tias_bandwidth_indicator | 1 | bslbf |
|    as_bandwidth_indicator | 1 | bslbf |
|    FEC_OTI_indicator | 1 | bslbf |
|    if(tias_bandwidth_indicator == '1') { | | |
|       tias_bandwidth | 16 | uimsbf |
|    } | | |
|    if(as_bandwidth_indicator == '1') { | | |
|       as_bandwidth | 16 | uimsbf |
|    } | | |
|    if(FEC_OTI_indicator == '1') { | | |
|      FEC_encoding_id | 8 | uimsbf |
|      FEC_instance_id | 16 | uimsbf |
|    } | | |
| } | | |

Fig. 24

| Syntax | No. of Bits | Format |
|---|---|---|
| NRT_DCD_bootstrap_descriptor() { | | |
|     descriptor_tag | 8 | 0x8E |
|     descriptor_length | 8 | uimsbf |
|     service_id_length | 8 | uimsbf |
|     service_id_text() | var | |
|     service_name_length | 8 | uimsbf |
|     service_name_text() | var | |
| } | | |

Fig. 25

| Syntax | No. of Bits | Format |
|---|---|---|
| NRT_DCD_channel_descriptor() { | | |
|   descriptor_tag | 8 | 0x8F |
|   descriptor_length | 8 | uimsbf |
|   channel_id_length | 8 | uimsbf |
|   channel_id_text() | var | |
|   channel_name_length | 8 | uimsbf |
|   channel_name_text() | var | |
|   storage_reservation | 32 | uimsbf |
|   updated | 32 | uimsbf |
|   content_types_length | 8 | uimsbf |
|   content_types_text() | var | |
|   mime_types_length | 8 | uimsbf |
|   mime_types_text() | var | |
|   charging_rules_length | 8 | uimsbf |
|   charging_rules_text() | var | |
|   num_purchase_options | 8 | uimsbf |
|   for (i=0; i<num_purchase_options; i++) | | |
|   { | | |
|     purchase_option_id_length | 8 | uimsbf |
|     purchase_option_id_text() | var | |
|     reserved | 6 | '111111' |
|     cost_information_flag | 1 | bsblf |
|     price_information_flag | 1 | bsblf |
|     if (cost_information_flag == '1') | | |
|     { | | |
|       cost_inforamtion_length | 8 | uimsbf |
|       cost_inforamtion_text() | var | uimsbf |
|     } | | |
|     if (price_information_flag == '1') | | |
|     { | | |
|       amount | 32 | uimsbf |
|       currency | 16 | uimsbf |
|     } | | |
|   } | | |
| } | | |

Fig. 28

| Syntax | No. of Bits | Format |
|---|---|---|
| NRT_information_table_section() { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NRT_IT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
|    content_linkage | 32 | uimsbf |
|    updates_available | 1 | bslbf |
|    TF_available | 1 | bslbf |
|    available_on_internet | 1 | bslbf |
|    low_latency | 1 | bslbf |
|    playback_length_in_seconds | 20 | uimsbf |
|    content_length_included | 1 | bslbf |
|    playback_delay_included | 1 | bslbf |
|    expiration_included | 1 | bslbf |
|    reserved | 1 | '1' |
|    duration | 12 | uimsbf |

Fig. 29

| | | |
|---|---|---|
| `if (content_length_included==1) {` | | |
| `    content_length` | 40 | uimsbf |
| `}` | | |
| `if (playback_delay_included==1) {` | | |
| `    reserved` | 4 | '1111' |
| `    playback_delay` | 20 | uimsbf |
| `}` | | |
| `if (expiration_included==1) {` | | |
| `    expiration` | 32 | uimsbf |
| `}` | | |
| `content_name_length` | 8 | uimsbf |
| `content_name_text()` | var | |
| `reserved` | 4 | '1111' |
| `content_descriptors_length` | 12 | uimsbf |
| `for (i=0; i<N; i++) {` | | |
| `    content_descriptor()` | | |
| `}` | | |
| `}` | | |
| `reserved` | 6 | '111111' |
| `descriptors_length` | 10 | uimsbf |
| `for (i=0; i<M; i++) {` | | |
| `    descriptor()` | | |
| `}` | | |
| `}` | | |

Fig. 30

```xml
<?xml version="1.0" encoding="UTF-8"?>
<xs:schema xmlns="" http://www.atsc.org/XMLSchemas/mrt/flute/fdt/1.0"
  xmlns:xs="http://www.w3.org/2001/XMLSchema" targetNamespace =
"http://www.atsc.org/XMLSchemas/mrt/flute/fdt/1.0" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-Linkage" type="Content-Linkage-Type" minOccurs="0" maxOccurs="unbounded"/>  ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-Linkage" type="Content-Linkage-Type" minOccurs="0" maxOccurs="unbounded"/>  ②
      <xs:any namespace="##other" processContents="skip" minOccurs="0" maxOccurs="unbounded"/>
    </xs:sequence>
```

Fig. 31

```
<xs:attribute name="Content-Location" type="xs:anyURI" use="required"/>   (4)
<xs:attribute name="TOI" type="xs:positiveInteger" use="required"/>
<xs:attribute name="Content-Length" type="xs:unsignedLong" use="required"/>
<xs:attribute name="Transfer-Length" type="xs:unsignedLong" use="optional"/>
<xs:attribute name="Content-Type" type="xs:string" use="optional"/>
<xs:attribute name="Content-Encoding" type="xs:string" use="optional"/>
<xs:attribute name="Content-MD5" type="xs:base64Binary" use="optional"/>
<xs:attribute name="FEC-OTI-FEC-Encoding-ID" type="xs:unsignedLong" use="optional"/>
<xs:attribute name="FEC-OTI-FEC-Instance-ID" type="xs:unsignedLong" use="optional"/>
<xs:attribute name="FEC-OTI-Maximum-Source-Block-Length" type="xs:unsignedLong" use="optional"/>
<xs:attribute name="FEC-OTI-Encoding-Symbol-Length" type="xs:unsignedLong" use="optional"/>
<xs:attribute name="FEC-OTI-Max-Number-of-Encoding-Symbols" type="xs:unsignedLong" use="optional"/>
<xs:attribute name="FEC-OTI-Scheme-Specific-Info" type="xs:base64Binary" use="optional"/>
<xs:anyAttribute processContents="skip"/>
</xs:complexType>
<xs:complexType name="Content-Linkage-Type">
<xs:simpleContent>
<xs:extension base="xs:unsignedInt">
<xs:attribute name="entry" type="xs:boolean" use="optional" default="false"/>   (3)
<xs:anyAttribute processContents="skip"/>
</xs:extension>
</xs:simpleContent>
</xs:complexType>
</xs:schema>
```

METHOD OF PROCESSING NON-REAL TIME SERVICE AND BROADCAST RECEIVER

This application claims the benefit of priority of PCT/KR2011/002164 filed on Mar. 29, 2011, U.S. Provisional Application No. 61/318,385 filed on Mar. 29, 2010 and U.S. Provisional Application No. 61/334,590 filed on May 14, 2010, all of which are incorporated by reference in their entirety herein.

TECHNICAL FIELD

The present disclosure relates to a method for processing non-real time service and broadcast receiver thereof.

BACKGROUND ART

The present invention relates to a signaling method for a service type of a service transmitted by non-real time (hereinafter abbreviated NRT) and detailed information on the service through a broadcast network and an operation of an NRT receiver for receiving to process the corresponding information, and more particularly, to a broadcast receiver and a method for providing NRT service by accessing the files associated with the NRT content. Although the present invention is suitable for a wide scope of applications, it is particularly suitable for the receiver to obtain additional information on the corresponding NRT service using the service relevant signaling information, determine how to process and output the corresponding service to a user and determine an operation of an associated application module.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 illustrates a bitstream syntax structure of a virtual channel table (VCT) according to the present invention;

FIG. 5 illustrates the meaning of service type and the field values of the virtual channel table (VCT) of FIG. 4 according to the present invention;

FIG. 6 illustrates a revised meaning of Advanced Television Systems Committee (ATSC) service type and the field values of the VCT;

FIG. 7 illustrates a bitstream syntax structure of a data service table (DST) according to the present invention;

FIG. 10 illustrates the meaning of Application Identifier Description Field;

FIG. 11 illustrates a proposed meaning of Application Identifier Description Field according to the present invention;

FIG. 12 illustrates a bitstream syntax structure and general table format used in NRT service signaling table according to the present invention;

FIGS. 13 and 14 illustrate a bitstream syntax structure of an NRT service map table (NST) according to the present invention;

FIG. 15 illustrates the meaning of MH service category according to the present invention;

FIG. 16 illustrates a bitstream syntax structure of NRT Component descriptor;

FIG. 17 illustrates the meaning of component type of ATSC-Mobile/Handheld (M/H) configured according to the present invention;

FIG. 18 illustrates a bitstream syntax structure of NRT_component_descriptor( ) configured according to the present invention;

FIG. 19 illustrates a bitstream syntax structure of File Delivery over Unidirectional Transport (FLUTE) file delivery NRT_component_data( ) using component_descriptor( ) of FIG. 18 configured according to the present invention;

FIG. 24 illustrates a bitstream syntax structure of NRT DCD Bootstrap descriptor configured according to the present invention;

FIG. 25 illustrates a bitstream syntax structure of NRT DCD channel descriptor configured according to the present invention;

FIGS. 28 and 29 illustrate a bitstream syntax structure of NRT_information_table_section (NRT-IT) configured according to the present invention;

FIGS. 30 and 31 illustrate an FDT XML schema configured according to the present invention;

BEST MODE FOR CARRYING OUT THE INVENTION

Figure 1:
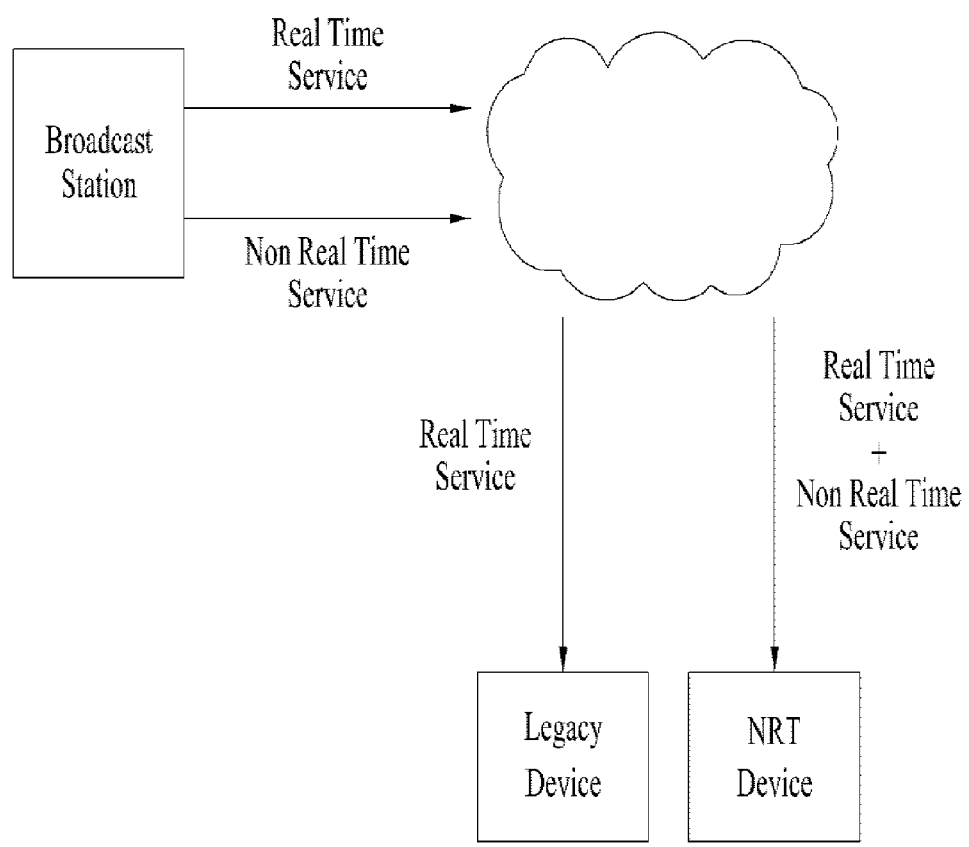
FIG. 1 illustrates a conceptual diagram of providing a real-time (RT) service and a non-real time (NRT) service.

Reference will now be made in detail to the preferred embodiments of the present invention, examples of which are illustrated in the accompanying drawings. Wherever possible, the same reference numbers will be used throughout the drawings to refer to the same or like parts.

Terminologies used for the present invention are selected from general terminologies, which are currently and widely used, in consideration of functions in the present invention but may vary according to intentions of a person having an ordinary knowledge in the technical field, practices, or the advent of new technology, etc. In specific case, a terminology may be arbitrarily chosen by the applicants(s). In this case, its detailed meaning shall be described in Detailed Description of Invention or the Preferred Embodiments. Therefore, the terminology used for the present invention needs to be defined based on the intrinsic meaning of the terminology and the contents across the present invention instead of a simple name of the terminology.

A real time (RT) service among terminologies used for the present invention means a real-time service as it is. On the contrary, a non-real time (NRT) service means a non-real time service that is not bind on time except the RT service.

Among the terms used in the description of the present invention, main service data correspond to data that can be received by a fixed receiving system and may include audio/video (A/V) data. More specifically, the main service data may include A/V data of high definition (HD) or standard definition (SD) levels and may also include diverse data types required for data broadcasting. Also, the known data correspond to data pre-known in accordance with a pre-arranged agreement between the receiving system and the transmitting system.

Additionally, among the terms used in the present invention, "M/H" (or MH) corresponds to the initials of "mobile" and "handheld" and represents the opposite concept of a fixed-type system. Furthermore, the M/H service data may include at least one of mobile service data, and handheld service data, and will also be referred to as "mobile service data" for simplicity. Thereafter, the M/H, MH, and mobile are used as the same meaning. Herein, the mobile service data not only correspond to M/H service data but may also include any type of service data with mobile or portable characteristics. Therefore, the mobile service data according to the present invention are not limited only to the M/H service data.

The above-described mobile service data may correspond to data having information, such as program execution files, stock information, and so on, and may also correspond to A/V data. Most particularly, the mobile service data may correspond to A/V data having lower resolution and lower data rate as compared to the main service data. For example, if an A/V codec that is used for a conventional main service data corresponds to a MPEG-2 codec, a MPEG-4 advanced video coding (AVC) or scalable video coding (SVC) having better image compression efficiency may be used as the A/V codec for the mobile service. Furthermore, any type of data may be transmitted as the mobile service data. For example, transport protocol expert group (TPEG) data for broadcasting real-time transportation information or non-real time (NRT) service data may be transmitted as the main service data.

Also, a data service using the mobile service data may include weather forecast services, traffic information services, stock information services, viewer participation quiz programs, real-time polls and surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

A transmission system of the present invention can multiplex and transmit mobile service data containing an NRT service and main service data in the same or different physical channels, without influencing the reception of main service data by an existing reception system (backward compatibility).

Furthermore, the transmitting system according to the present invention performs additional encoding on the mobile service data and inserts the data already known by the receiving system and transmitting system (e.g., known data), thereby transmitting the processed data.

Therefore, when using the transmitting system according to the present invention, the receiving system may receive the mobile service data during a mobile state and may also receive the mobile service data including an NRT service with stability despite various distortion and noise occurring within the channel.

FIG. 1 is an exemplary conceptual diagram for an NRT service.

First of all, a broadcasting station transmits an RT (real time) service according to a conventional method. In doing so, the broadcasting station transmits the RT service or an NRT (non-real time) service using a bandwidth left in the due course. In this case, the NRT service can contain a news clip, weather information, advertisements, content for Push VOD (video on demand) and the like.

Yet, a related art DTV receiver, i.e., a legacy device has the principle that the operation is not affected by an NRT stream included within a channel. However, the related art DTV receiver has a problem in receiving and processing an NRT service provided by a broadcasting station properly because of not having a means for processing unit for the NRT service.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. For this, this specification discloses a method of defining and providing signaling information to enable a receiver to receive and process an NRT service properly. In this case, a broadcasting station provides signaling information. Specifically, at least one unique packet identifier (PID) for identifying an NRT service can be allocated.

Figure 2:
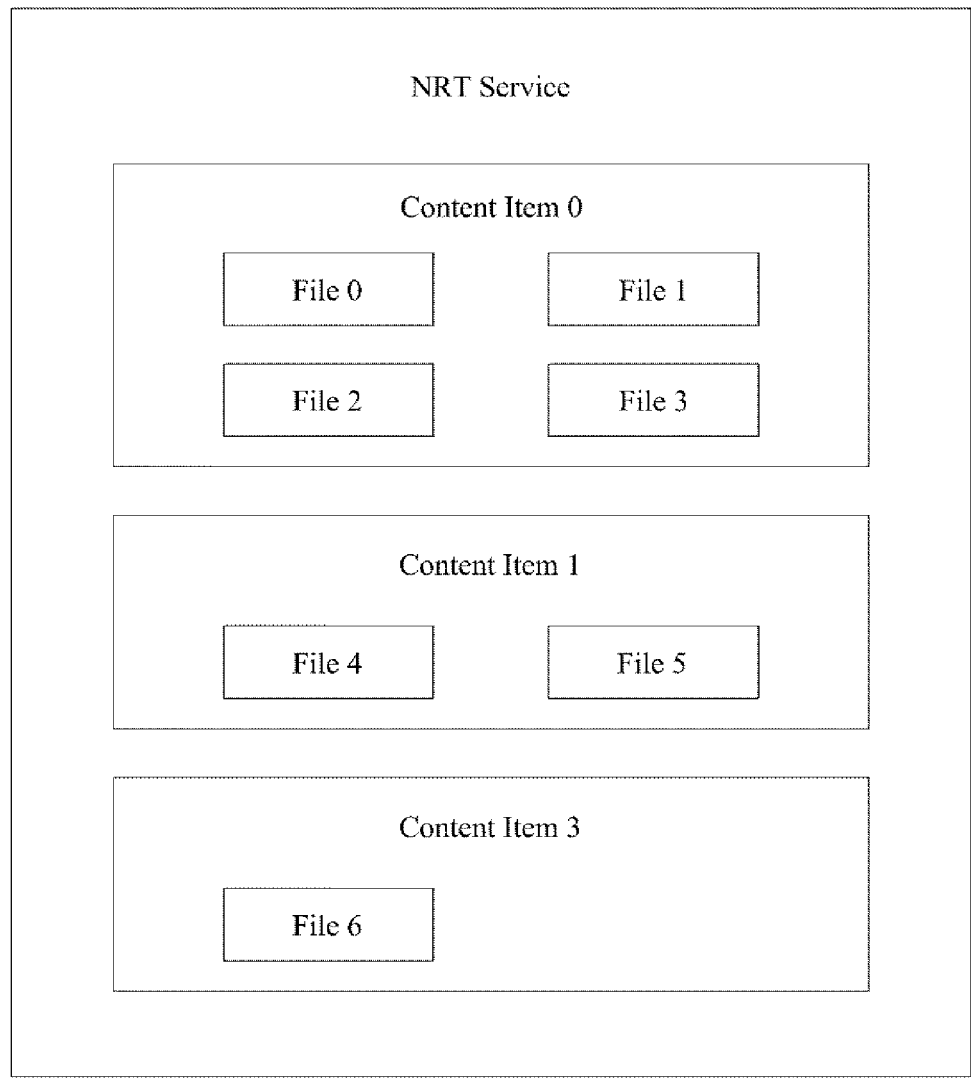
FIG. 2 is a diagram illustrating the relationship between an NRT service, content item, and files.

FIG. 2 is an exemplary diagram to explain relations among an NRT service, content items and files.

Referring to FIG. 2, an NRT service can include one or more content items. And, each of the content items can include one or more files. And, each of the content items is an independently playable entity and may correspond to a program or an event in a real time broadcast. Therefore, the NRT service means a group that is serviceable with a combination of the above content items. And, the NRT service corresponds to a channel concept in real time.

In order for a receiver to properly process the above NRT service, signaling for the corresponding NRT service is required. The present invention intends to properly process an NRT service received by a receiver by defining and providing the signaling information. Besides, details of the signaling information shall be described in the description of the corresponding part.

First of all, NRT services can be mainly categorized into a fixed NRT service and a mobile NRT service according to a type of acquiring an IP datagram. In the following description, the fixed NRT service and the mobile NRT service are sequentially specified for clarity and convenience of explanation.

Figure 3:
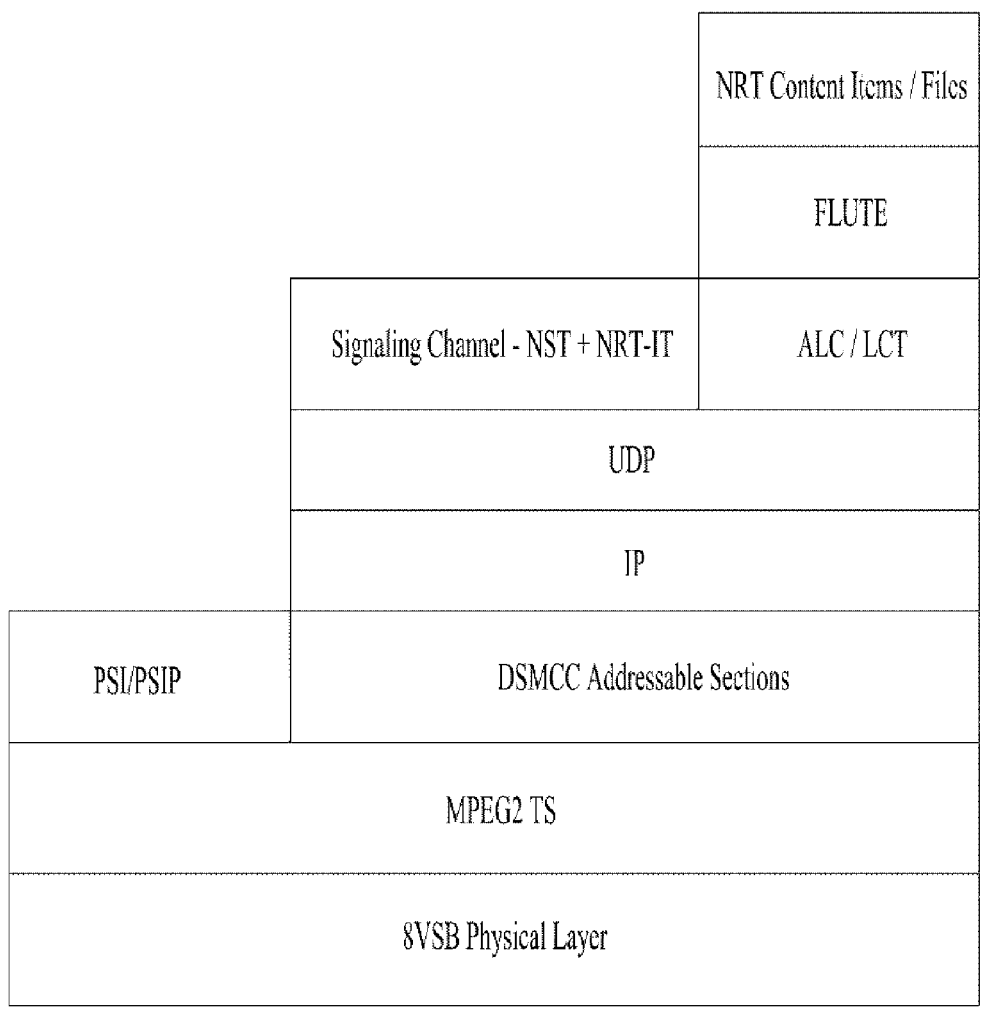
FIG. 3 illustrates an embodiment of a protocol stack for a fixed NRT service according to the present invention.

FIG. 3 is a diagram for a protocol stack of a fixed NRT service configured according to one embodiment of the present invention.

Referring to FIG. 3, a protocol stack for providing a fixed NRT service transmits NRT content items/files, IP datagram including a signaling channel for providing NST and NCT and PSI/PSIP data using an MPEG-2 TS format.

In FIG. 3, the fixed NRT service is packetized according to UDP in an IP layer. The UDP packet becomes UDP/IP packet data by being packetized again according to an IP scheme. In this disclosure, the packetized UDP/IP packet data is named an IP datagram for clarity and convenience.

The NRT content items/files are packetized according to FLUTE scheme or ALC/LCT scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a FDT as well.

A signaling information channel including an NST and an NCT is packetized according to a UDP scheme. This UDP packet is packetized according to an IP scheme again to become UDP/IP packet data, i.e., IP datagram. This IP datagram is also contained in the MPEG-2 TS through the DSM-CC addressable sections for transport.

And, a PSI/PSIP table is separately defined and contained in the MPEG-2 TS.

The MPEG-2 TS containing the above described NRT content items/files, signaling information channel and PSI/PSIP data therein are transferred by being modulated by a predetermined transmission scheme such as VSB transmission scheme.

FIG. 4 is a diagram for a bit-stream section of a Virtual Channel Table (VCT) section configured according to one embodiment of the present invention.

Referring to FIG. 4, a VCT section is described as having a table format similar to that of an MPEG-2 private section. However, this is merely exemplary, and the present invention will not be limited to the example given herein.

The VCT can be divided into a header, a body and a trailer. The header part ranges from table_id field to protocol_version field. And, transport_stream_id field is a 16-bit field and indicates an MPEG-2 TSID within a program association table (PAT) defined by a PID value of '0' for multiplexing. In the body part, num_channels_in_section field is an 8-bit field and indicates the number of virtual channels within a VCT section. Finally, the trailer part includes a CRC_32 field.

First of all, the header part is explained as follows.

A table_id field is an 8-bit unsigned integer number that indicates the type of table section being defined herein. For the virtual_channel_table_section( ) the table_id shall be '0xC8'.

A section_syntax_indicator is a one-bit field which shall be set to '1' for the virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT. For the current VCT (current_next_indicator='1'), the version number shall be incremented by '1' whenever the definition of the current VCT changes. Upon reaching the value '31', it wraps around to '0'. For the next VCT (current_next_indicator='0'), the version number shall be one unit more than that of the current VCT (also in modulo 32 arithmetic). In any case, the value of the version_number shall be identical to that of the corresponding entries in the MGT.

A current_next_indicator is a one-bit indicator, which when set to '1' indicates that the VCT sent is currently applicable. When the bit is set to '0', it indicates that the table sent is not yet applicable and shall be the next table to become valid. This standard imposes no requirement that "next" tables (those with current_next_indicator set to '0') must be sent. An update to the currently applicable table shall be signaled by incrementing the version_number field.

A section_number field (8 bit) gives the number of this section. The section_number of the first section in the TVCT shall be '0x00'. It shall be incremented by one with each additional section in the TVCT.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part will now be explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel. The major_channel_number shall be between '1' and '99'. The value of major_channel_number shall be set such that in no case is a major_channel_number/minor_channel_number pair duplicated within the TVCT.

A minor_channel_number field is a 10-bit number in the range '0' to '999' that represents the "minor" or "sub"-channel number. This field, together with major_channel_number, performs as a two-part channel number, where minor_channel_number represents the second or right-hand part of the number. When the service_type is analog television, minor_channel_number shall be set to '0'. Services whose service_type is either ATSC digital television or ATSC audio only shall use minor numbers between '1' and '99'. The value of minor_channel_number shall be set such that, in no case, major_channel_number/minor_channel_number pair is duplicated within the TVCT. For other types of services, such as data broadcasting, valid minor virtual channel numbers are between '1' and '999'.

A modulation mode field is an 8-bit unsigned integer number that indicates the modulation mode for the transmitted carrier associated with this virtual channel.

A carrier_frequency field includes the recommended value for these 32 bits is zero. Use of this field to identify carrier_frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

A service_type is a 6-bit enumerated type field that shall identify the type of service carried in this virtual channel. Herein, FIG. 6 is an exemplary diagram of an ATSC service type according to the present invention and FIG. 7 is another exemplary diagram of an ATSC service type according to the present invention.

According to the present invention, a fixed NRT service uses a conventional ATSC terrestrial broadcasting environment. In particular, a fixed NRT service, which is based on a scheme of transporting an IP datagram via DSM-CC addressable section, can be provided by the following method for example.

1. Case of transmission on virtual channel including audio and/or video: In this case, a service type of a corresponding virtual channel can follow FIG. 5 as stipulated in the conventional ATSC specification. In particular, the service type follows '0x04' indicating ATSC data only service shown in FIG. 6 as proposed in the present invention. Alternatively, the service type can identify an NRT service by being included in another service type of the related art.

2. Case of transmission on virtual channel including NRT service only: Referring to FIG. 6, signaling can be performed to indicate an NRT application ('0x05') by allocating a new service type value.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included.

An additional_descriptors_length field is total length (in bytes) of the VCT descriptor list that follows.

The trail part is explained as follows.

CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

In the above description, the data service table (DST) may be received through a PID included in service_location_descriptor. And, it is able to know a type of application and detailed information of a data broadcast stream carried on this channel through the DST.

FIG. 7 is a diagram for a bit-stream syntax of a DST section to identity an NRT application configured according to one embodiment of the present invention.

The semantics of the fields comprising the data_service_table_bytes structure are defined below.

An sdf_protocol_version field (8-bit) shall be used to specify the version of the Service Description Framework (SDF) protocol. The value of this field shall be set to '0x01'. The value '0x00' and the values in the range '0x02' to '0xFF' shall be ATSC reserved.

An application_count_in_section field (8-bit) shall specify the number of applications listed in the DST section.

A compatibility_descriptor( ) field shall contain a DSM-CC compatibility_descriptor. Its purpose shall be to signal compatibility requirements of the application so that the receiving platform can determine its ability to use this data service.

An app_id_byte_length field (16-bit) shall specify the number of bytes used to identify the application. The value of this field shall account for the length of both the app_id_description field and the app_id_byte fields that follow. The value '0x0000' shall indicate that no app_id_description field or app_id_byte fields follow. The value '0x0001' is forbidden.

An app_id_description field (16-bit) shall specify the format and semantics of the following application identification bytes.

Table 1 specifies the values and associated formats for application identifier. In this case, if a value of the app_id_description field is set to '0x0003', the receiver is aware that the application is an NRT application.

TABLE 1

| Value | Application Identifier Format |
| --- | --- |
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) shall represent a byte of the application identifier.

A tap count field (8-bit) shall specify the number of Tap( ) structures used by this application.

A protocol_encapsulation field (8-bit) shall specify the type of protocol encapsulation used to transmit the particular data element referred to by the Tap( ). The following Table 2 is an exemplary diagram for a type of the protocol encapsulation.

TABLE 2

| Value | Encapsulated Protocol |
| --- | --- |
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0Xff | User defined |

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A tap_id field (16-bit) shall be used by the application to identify the data elements. The value of tap_id is scoped by the value of the app_id_byte fields associated with the Tap ( ) in the DST. The tap_id field is unique within an application. The tap_id value is selected by the data service provider at authoring time. It is used in the application as a handle to the data element.

A use field (16-bit) is used to characterize the communication channel referenced by the association_tag. Use of use values other than '0x0000' is beyond the scope of this standard. The use value '0x0000' indicates that this field is unknown.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service. In the latter case, the value of this field shall match the association_tag value in the commonDescriptorHeader structure of a DSM-CC Resource Descriptor in the Network Resource Table of the data service.

A selector( ) field shall specify a particular data element available in a data elementary stream or a communication channel referenced by the association_tag field. In addition, the selector structure may indicate the protocol required for acquiring this data element.

A tap_info_length field (16-bit) shall specify the number of bytes of the descriptors following the tap_info_length field.

A descriptor( ) field shall follow the descriptor format.

An app_info_length field (8-bit) shall specify the number of bytes of the descriptors following the app_info_length field.

Another descriptor( ) field shall follow the descriptor format.

An app_data_length field (16-bit) shall specify the length in bytes of the following app_data_byte fields.

An app_data_byte field (8-bit) shall represent one byte of the input parameters and other private data fields associated with the application.

A service_info_length (8-bit) shall specify the number of bytes of the descriptors following the service_info_length field.

Another descriptor( ) field shall follow the descriptor format.

A service_private_data_length field (16-bit) shall specify the length in bytes of the private fields to follow.

A service_private_data_byte field (8-bit) shall represent one byte of the private field.

After the NRT application has been identified, an IP stream, on which a well-known IP address for delivering NRT service signaling data delivered via an IP layer, is searched for using tap information.

If a value of protocol_encapsulation is set to '0x04', an asynchronous IP datagram is transferred. If selector_type is set to '0x0102', a value of device_id, which indicates a destination address, is delivered through selector_bytes. In order to accurately interpret a value of the selector_bytes, multi-protocol_encapsulation_descriptor is used. And, the number of valid bytes in the device_id value is signaled.

Therefore, it is able to know a multicast address (or, an address range) of an IP datagram carried on the corresponding PID via the tap information.

It is checked whether a well-known IP address, to which NRT service signaling data will be delivered, is loaded on the tap. This is received in the first place. An IP packet is then received.

The NRT service signaling data is extracted from the IP packet. The extracted NRT service signaling data is delivered to and processed by an NRT application manager. An NRT service can be then initiated.

As mentioned in the above description, an NRT service signaling channel is multicasted by being encapsulated in an IP datagram via a well-known IP address.

Figure 8:
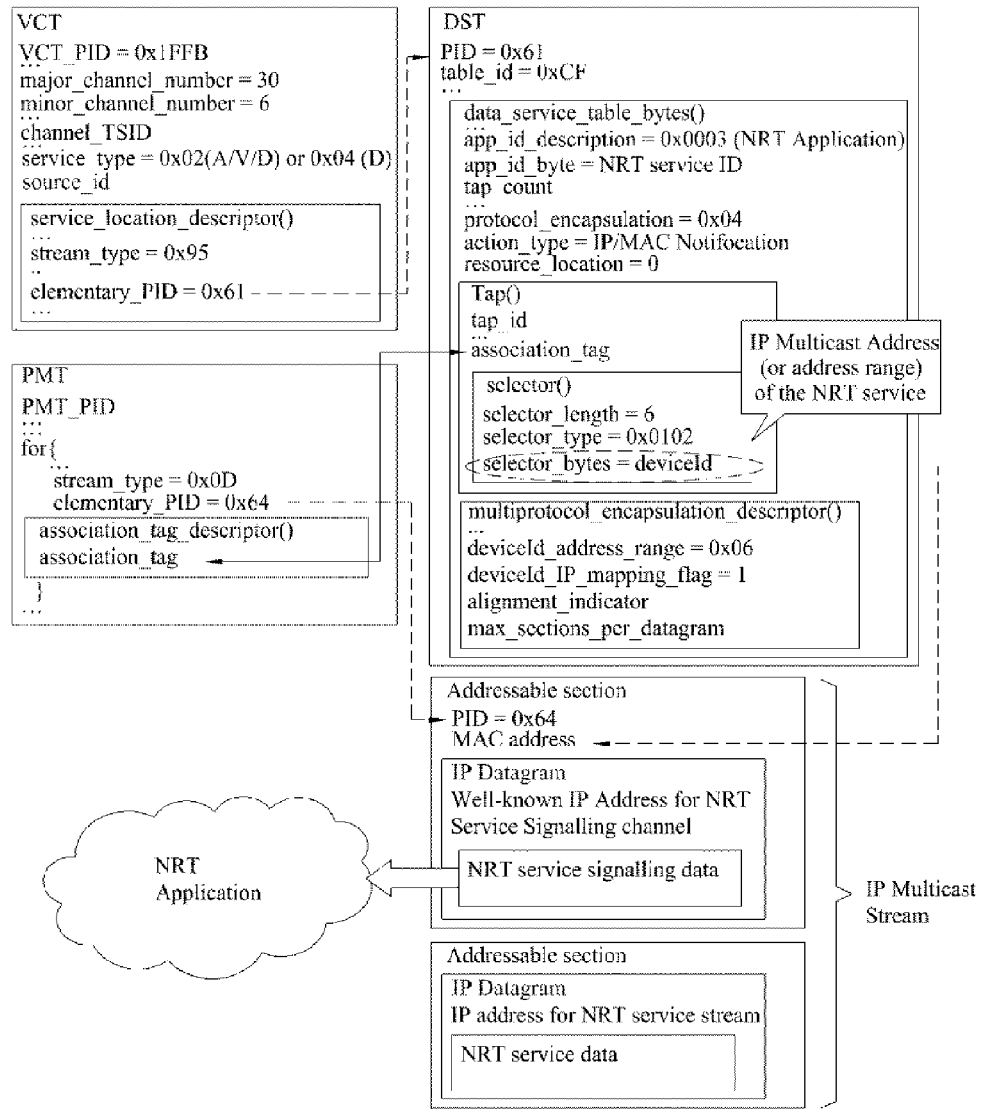
FIG. 8 illustrates a diagram for acquiring connection information of IP stream transmitting NRT service signaling channel using Program Specific Information (PSI)/Program and System Information Protocol (PSIP) table.
Figure 9:
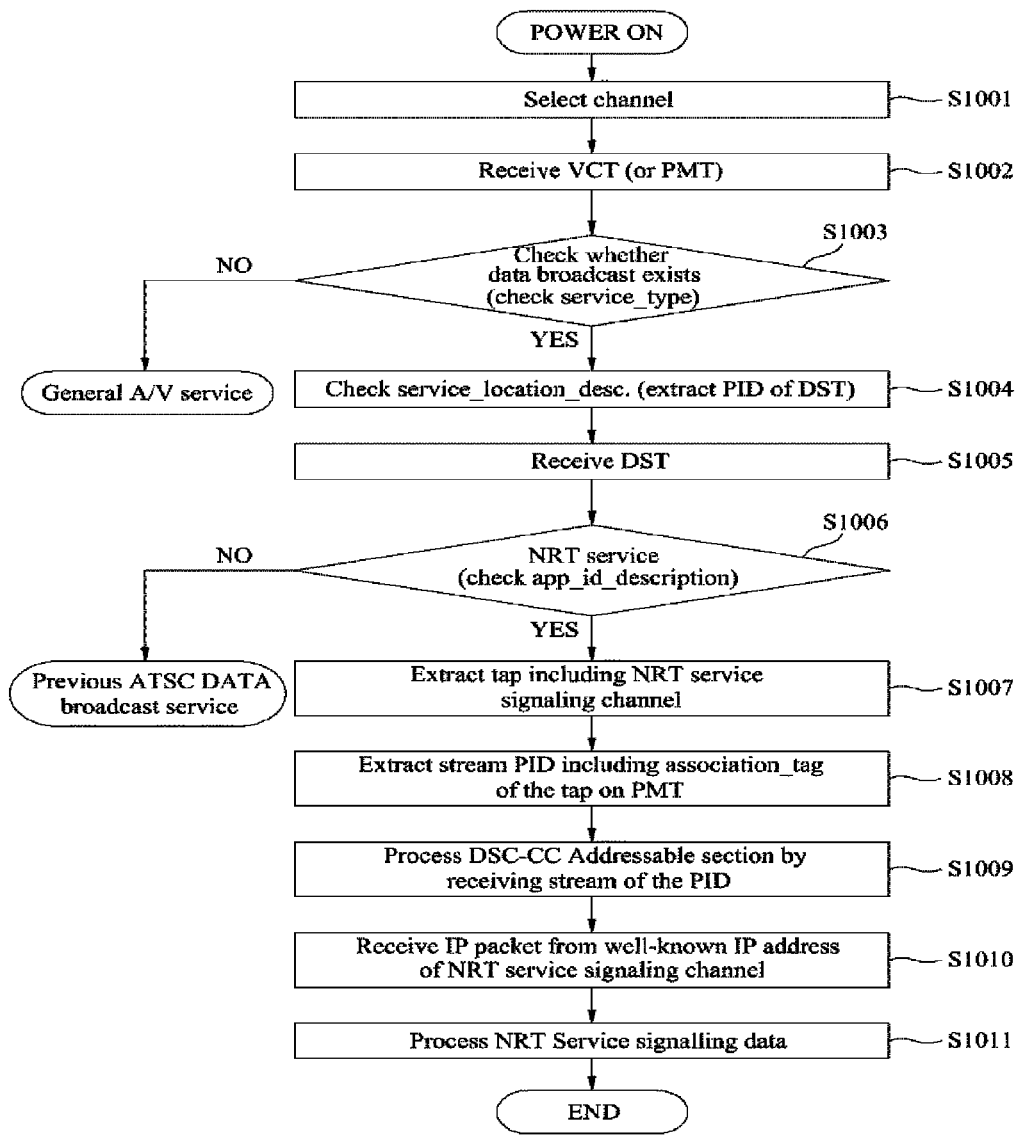
FIG. 9 is a flowchart illustrating the steps of acquiring connection information of IP stream transmitting NRT service signaling channel using PSI/PSIP table of FIG. 8.

FIG. 8 is an exemplary diagram for a signaling method in case of transmitting an NRT service through an ATSC broadcasting system according to another embodiment of the present invention, and FIG. 9 is an exemplary flowchart for FIG. 8.

FIG. 8 shows a method of configuring a separate NRT service signaling channel via an IP side. In this case, the NRT service signaling channel is multicasted by being encapsulated in an IP datagram via a well-known IP address. A signaling structure for this case is shown in FIG. 8. In particular, it can be observed that a separate NRT service signaling channel exists as an IP multicast stream, whereas every signaling is performed by a PSIP side.

The VCT is similar to a channel concept and for example, the VCT PID equals to '0x1FFB.' The service_type of VCT refers to the service of the present VCT which identifies that the service is an NRT application and the stream_type which equals to for example '0x95' means that it is association with the Data Service Table (DST). The app_id_description field in the DST also identifies that the service is an NRT application. As shown in FIG. 8, the association_tag of the PMT has the same value with the Tap association_tag in the DST. After matching the association_tag between the PMT and the DST, the elementary_PID of the PMT is needed to identify the IP datagram of the NRT service signaling channel or the NRT service. As explained above, when the protocol_ encapsulation=0x04, an asynchronous IP datagram is transferred. If selector_type is set to '0x0102', a value of device_id, which indicates a destination address, is delivered through selector_bytes. In order to accurately interpret a value of the selector_bytes, multiprotocol_encapsulation_descriptor is used. And, the number of valid bytes in the device_id value is signaled.

A Tap( ) in the DST is used to find an application-level data element contained in a lower-layer communication channel. An association is made between the application-level data element and the Tap( ) through the use of an association_tag field. The value of the association_tag field in a Tap structure shall correspond to the value of either an association_tag field located in one Association Tag descriptor residing in the current PMT or an associationTag field located in the commonDescriptorHeader of one of the dsmccResourceDescriptor descriptors residing in the Network Resource Table. In a data service, the same association_tag value may be featured in more than one Tap structure. The association_tag shall be used as the base for determining the location of a data element. Relative to this base, the location of the data element may be further specified by means of the selector structure. A data receiver needs a reference list of all synchronized data elementary streams in a data service to be able to partition the Data Elementary Stream Buffer properly. Consequently, the DST shall include at least one Tap( ) for each of the data elementary streams of stream_type value 0x06 or 0x14 belonging to the data service.

A multiprotocol_encapsulation_descriptor may be included in the descriptor loop following the Tap structure in the Data Service Table when the value of the protocol_encapsulation field is equal to 0x03 or 0x04. The descriptor provides information defining the mapping of the deviceId fields to a specific addressing scheme. The descriptor also provides information on the number of valid bytes in the deviceId fields specified in the selector bytes of a Tap( ) including a selector_type field value equal to 0x0102. Finally, this descriptor may be used to signal alignment and protocol fragmentation rules.

A deviceId_address_range=0x06 means that the valid deviceID_address bytes equal to deviceId[47 . . . 0]. Further deviceId_IP_mapping_flag, when set to 1 means to signal an IP to MAC address mapping.

An alignment indicator shall indicate byte level alignment between the DSMCC_addressable_section and the Transport Stream bytes.

And max_sections_per_datagram, an 8-bit field, shall indicate the maximum number of Sections that can be used to carry a single datagram unit.

Further, the well-known IP address for NRT service signaling channel (NST and NCT) is defined through elementary_PID associated with the PMT. Moreover, the NRT service signaling data is transmitted and received through the well-known IP address for NRT service signaling channel of the IP Datagram. The NRT service signaling data can be transmitted in Transport Packet (TP) or via Internet Protocol (IP).

FIG. 9 is a flowchart of the above explanation.

Referring to FIG. 9, after a power of a receiver has been turned on, if a default channel or a channel by a user is selected [S1001], the receiver receives a VCT or a PMT [S1002].

With regard to this, information on a stream configuring each virtual channel is signaled to service_location_descriptor of the VCT or the ES_loop of the PMT.

Therefore, the receiver determines a type of a service provided on a selected channel by parsing service_type within the received VCT [S1003]. For instance, if a value of the service_type is set to '0x02', a type of a corresponding service provided on the selected channel may mean a digital A/V Data service type. If a value of the service_type is set to '0x04', a type of a corresponding service provided on the selected channel may mean a data only service type. If a value of the service_type is set to '0x08', a type of a corresponding service provided on the selected channel may mean an NRT only service type.

As a result of the determining step [S1003], if the corresponding service type is not a general A/V service, PID ('0x61') of a data service table (DST) is extracted by parsing service_location_descriptor in the channel loop of the VCT [S1004].

Subsequently, the DST is received using the extracted PID [S1005].

It is then determined whether the corresponding service provided on the selected channel is an NRT service from the received DST [S1006]. In doing so, the determination of a presence or absence of the NRT service can be performed by checking app_id_description within the DST. For instance, if a value of the app_id_description is set to '0x0003', it means that the corresponding service is an NRT application.

As a result of the determining step [S1006], if the corresponding service is an NRT service, a tap including an NRT service signaling channel is extracted [S1007]. And, elementary_PID including association_tag of the tap on the PMT is extracted [S1008].

After the elementary_PID has been received, a DSM-CC addressable section is processed [S1009].

Subsequently, after an IP packet has been received from a well-known IP address of the NRT service signaling channel [S1010], an NRT service is provided by processing the NRT service signaling data within the received IP packet [S1011].

With regard to this, after checking whether the NRT application exists on the virtual channel by the above method, an IP stream carrying the well-known IP address, to which the NRT service signaling data carried via an IP layer is delivered, is searched for using the tap information.

If a value of protocol_encapsulation is set to '0x04', an asynchronous IP datagram is transferred. If selector_type is set to '0x0102', a value of device_id indicating a destination address is delivered via selector_bytes.

Therefore, a PID of a transport stream can be known, on which the corresponding data is carried, through the tap information on a multicast address (or, an address range) of an IP datagram. It is checked whether a well-known IP address, to which NRT service signaling data will be delivered, is loaded on the tap. This is received in the first place. An IP packet is then received.

Subsequently, NRT service signaling data is extracted from the IP packet. The extracted NRT service signaling data is delivered to an NRT application manager. A corresponding service is then initiated.

FIG. 10 describes the format and the meaning of application identification bytes following the App_id_description of the DST table.

FIG. 11 shows the meaning of the fields as proposed in the present invention. FIG. 11 illustrates that the field of FIG. 10 is expanded to have a new value "0x0003" which is for the value of App_id_description for NRT application. In such a case the value of Application_id_byte equals to the Service ID value of the NRT Application. A Service ID for NRT Application may have an URI value which is a globally unique identifier.

FIG. 12 is a bitstream syntax structure of an NRT service signaling table configured according to the present invention. The NRT service signaling channel is multicasted by stacked in IP datagram through well-known IP address. The signaling data has similar table with the MPEG-2 Private section and the definition of the according fields are as follows.

A table_id field is an 8-bit field that shall identify the NRT service signaling table to which this section belongs.

A section_syntax_indicator is a 1-bit field that shall be set to '0' to always indicate that this table is derived from the "short" form of the MPEG-2 private section table.

A private_indicator is a 1-bit field that shall be set to '1.'

A section_length is a 12-bit field and it specifies the number of remaining bytes of this table section immediately following this field. The value in this field shall not exceed 4093 (0xFFD).

A table_id_extension is a 16-bit field and is table-dependent. It shall be considered to be logically part of the table_id field providing the scope for the remaining fields.

A version_number is a 5-bit field and is the version number of the NRT Service Signaling table section. The version_number shall be incremented by 1 modulo 32 when a change in the information carried within the M/N Service Signaling table section occurs.

A current_next_indicator is a 1-bit field which when set to '1' indicates that the MH_service_signaling_section sent is currently applicable. When the current_next_indicator is set to '0,' it indicates that the MH_service_signaling_section sent is not yet applicable and shall be the next MH_service_signaling_section with the same section_number, table_id_extension, and table_id to become valid.

A section_number is an 8-bit field that shall give the section number of this NRT Service Signaling table section. The section_number of the first section in an M/H Service Signaling table shall be 0x00. The section_number shall be incremented by 1 with each additional section in the NRT Service Signaling table.

A last_section_number is an 8-bit field that shall give the number of the last section, meaning the section with the highest section_number, of the NRT Service Signaling table of which this section is a part.

FIG. 13 and FIG. 14 illustrate a bitstream syntax structure of an NRT service map table (NST) section according to an embodiment of the present invention. The detail of each field of the NST section is explained in the following.

Although the syntax is written in an MPEG-2 private section format for better understanding, the data may be in any format. For example, it is possible to use another method in which the syntax is expressed in a Session Description Protocol (SDP) format and is then signaled through a Session Announcement Protocol (SAP).

In FIG. 13 and FIG. 14, a table_id field includes an 8-bit unsigned integer number that indicates the type of table section being defined in NRT Service Map Table (NST).

A section_syntax_indicator is a 1-bit field that shall be set to '0' to always indicate that this table is derived from the "short" form of the MPEG-2 private section table.

A private_indicator (1-bit) indicates whether the type of the corresponding section follows the private section type or not. (This field that shall be set to '1')

A section_length is a 12-bit field. It specifies the number of remaining bytes this table section immediately following this field. The value in this field shall not exceed 4093 (0xFFD)).

A table_id_extension field is a 16-bit field and is table-dependent. It shall be considered to be logically part of the table_id field providing the scope for the remaining fields. The table_id_extension field includes NST_protocol_version fields.

The NST_protocol_version field is an 8-bit unsigned integer field whose function is to allow, in the future, this NST to carry parameters that may be structured differently than those defined in the current protocol. At present, the value for the NST_protocol_version field shall be zero. Non-zero values of NST_protocol_version may be used by a future version of this standard to indicate structurally different tables.

A version_number field (5-bit) indicates the version_number of the NST.

A current_next_indicator field is a one-bit indicator, which when se to '1' shall indicate that the NST sent is currently applicable. When the bit is set to '0', it shall indicate that the table sent is not yet applicable and will be the next table to become valid. This standard imposes no requirement that "next" tables (those with current_next_indicator set to '0') must be sent. An update to the currently applicable table shall be signaled by incrementing the version_number field).

A section_number field is an 8-bit field that shall give the section number of this NST section. The section_number field of the first section in an NST shall be '0x00'. The section_number field shall be incremented by 1 with each additional section in the NST.

A last_section_number field is an 8-bit field that shall give the number of the last section (i.e., the section with the highest section_number) of the NST of which this section is a part).

A num_NRT_services field is an 8-bit field that specifies the number of services in this NST section.

A 'for' loop, which is also referred to as an "NRT service loop", is executed for the number of times as the number of NRT services corresponding to the num_NRT_services field value in providing signaling information of a plurality of NRT services. Thus, signaling information of the corresponding NRT service is indicated for each of the NRT services included in the NST section. Here, the following field information may be provided for each NRT service.

An NRT_service_status is a 2-bit enumerated field that shall identify the status of this NRT Service. The most significant bit shall indicate whether this NRT Service is active (when set to 1) or inactive (when set to 0) and the least significant bit shall indicate whether this NRT Service is hidden (when set to 1) or not (when set to 0). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A CP_indicator is a 1-bit field that shall indicate, when set, that content protection is applied to at least one of the components needed to provide a meaningful presentation of this NRT Service.

An NRT_service_id is a 16-bit unsigned integer number that shall uniquely identify this NRT Service within the scope of this NRT Broadcast.

The NRT_service_id of a service shall not change throughout the life of the service. To avoid confusion, it is recommended that if a service is terminated, then the NRT_service_id for the service should not be used for another service until after a suitable interval of time has elapsed.

A Short_NRT_service_name is the short name of the NRT Service. When there is no short name of this NRT Service, this field shall be filled with NULLs (0x00).

An NRT_service_category is a 6-bit enumerated type field that shall identify the type of service carried in this NRT Service as defined in FIG. 15.

A num_components is a 5-bit field specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of '1' for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that a NRT_service_destination_IP_address value is present, to serve as the default IP address for the components of this M/H Service.

A source_IP_address is a field that shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address is a field that shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

A 'for' loop, which will also be referred to as a "component loop," is executed as much as the number of times as the number of components corresponding to the num_components field value to provide access information of a plurality of components. This provides access information of each component included in the NRT service. Here, the following field information may be provided for each component. In an embodiment, one component corresponds to one FLUTE file delivery session (or FLUTE session). More specifically, files belonging to one content item are transmitted through one or more FLUTE file delivery sessions. The one or more FLUTE file delivery sessions are components of a service associated to the content item.

An essential_component_indicator is a one-bit indicator which, when set to '1', shall indicate that this component is an essential component for the NRT Service. Otherwise, this field indicates that this component is an optional component.

A port_num_count is a field that shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address is a field that shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field, that represents the destination UDP port number for this UDP/IP stream component.

A component_level_descriptor( ) indicates one or more descriptors providing additional information for this IP stream component, may be included.

An NRT_service_level_descriptor( ) indicates zero or more descriptors providing additional information for this M/H Service, may be included.

A Virtual_channel_level_descriptor( ) indicates zero or more descriptors providing additional information for the virtual channel which this NST describes, may be included.

FIG. 15 as mentioned above is a table defining the NRT service categories indicated in FIG. 14 NRT_service_category.

FIG. 16 is a bitstream syntax structure of an NRT/MH component descriptor and the fields are defined as follows.

A descriptor_tag is an 8-bit unsigned integer shall have the value 0x8D, identifying this descriptor as the MH_component_descriptor.

A descriptor_length is a 8-bit unsigned integer shall specify the length (in bytes) immediately following this field up to the end of this descriptor.

A component_type is a 7-bit field that shall identify the encoding format of the component. The value may be any of the values assigned by LANA for the payload_type of an RTP/AVP stream, or it may be any of the values in FIG. 17 assigned by the present invention, or it may be a "dynamic value" in the range 96?127. For components consisting of media carried via RTP, the value of this field shall match the value in the payload_type field in the RTP header of the IP stream carrying this component. Note that additional values of the component_type field in the range of 43-71 can be defined in future versions of this standard.

When the NRT content stream is delivered based on FLUTE, "38" in the Component Type definition according to ATSC-M/H as illustrated in FIG. 17 is used by adding parameters accordingly or "43," which is not currently used but can be newly defined for NRT delivery.

A num_STKM_stream is an 8-bit unsigned integer field that shall identify the number of STKM streams associated with this component.

A STKM_stream_id is an 8-bit unsigned integer field that shall identify an STKM stream where keys to decrypt this protected component can be obtained, by reference to the STKM_stream_id in the component descriptor for the STKM stream.

An MH_component_data(component_type) is the MH_component_data( ) element that provides the encoding parameters and/or other parameters necessary for rendering this component. The structure of the MH_component_data is determined by the value of component_type field.

The parameters needed for signaling FLUTE session are the source IP address, the number of channels in the session, the destination IP address and port number for each channel in the session, the transport session identifier (TSI) of the session, and the start time and end time of the session. Optionally, the following parameters may be associated with the session, which are FEC Object Transmission Information, some information that tells receiver in the first place, that the session contains files that are of interest, and bandwidth specification.

Along with FIG. 16 MH_component_descriptor, an NRT_component_descriptor is also used. FIG. 18 illustrates an embodiment of a bitstream syntax structure of a component_level_descriptors( ). The component_descriptor( ) is used as one of the component_level_descriptor component_level_descriptors( ) of the NST and describes additional signaling information of the corresponding component.

The following is a description of each field of the component_descriptor( ).

In FIG. 18, a descriptor_tag field (8-bit) is a descriptor identifier and it can be set as an identifier that identifies the component_descriptor( ).

A descriptor_length field (8-bit) describes the remaining length of the descriptor starting after the descriptor_length field and to the end of this descriptor, in bytes.

A component_type field (7-bit) shall identify the encoding format of the component. The value may be any of the values assigned by LANA for the payload_type of an RTP/AVP stream, or it may be any of the values assigned by ATSC, or it may be a "dynamic value" in the range 96-127. For components consisting of media carried via RTP, the value of this field shall match the value in the payload_type field in the RTP header of the IP stream carrying this component. Note that additional values of the component_type field in the range of 43-71 can be defined in future versions of this standard.

A component_encryption_flag (1-bit) informs whether the corresponding component is encrypted or not.

A Num_STKM_streams field (8-bit) indicates the number STKM streams if component_encryption_flag has been encrypted. (The num_STKM_streams field (8-bit) is an 8-bit unsigned integer field that shall identify the number of STKM streams associated with this component.

A STKM_stream_id field (8-bit) is repeated as much as the field value of Num_STKM_streams and indicates a value that identifies a STKM stream that can acquire a key required for decryption.

An NRT_component_data (component_type) element provides the encoding parameters and/or other parameters necessary for rendering this component. The structure of the component_data is determined by the value of component_type field.

For example, if the component_type field value is 35 (FIG. 17), then NRT_component_data (component_type) field provides component data for H.264/AVC video stream.

In another example, if the component_type field value is 38 then NRT_component_data (component_type) field provides data for FLUTE file delivery as shown in FIG. 17.

One NRT service can be included in multiple FLUTE sessions. Thus, one NRT service may be configured with plurality of FLUTE sessions. In other words, files belonging to one content item are transmitted through one or more FLUTE session. Each FLUTE session may be signaled using NRT_component_data( ) as shown in FIG. 17.

FIG. 19 illustrates an example of the bitstream syntax structure of NRT_component_data( ) that provides data for FLUTE file delivery according to the present invention. The following explains each field in the NRT_component_data( ).

A TSI field (16-bit unsigned integer) shall be the Transport Session Identifier (TSI) of FLUTE session.

A session_start_time field (16-bit) indicates the start time of the FLUTE session. If the field values are all '0', then it can be interpreted that the FLUTE session has already begun.

A session_end_time field (16-bit) indicates the end time of the FLUTE session. If the field values are all '0,' then it can be interpreted that the FLUTE session continues for unlimited amount of time.

A tias_bandwidth_indicator field (1-bit) flags the inclusion of TIAS bandwidth information. This bit shall be set to '1' to indicate the TIAS bandwidth field is present, and it shall be set to '0' to indicate the TIAS bandwidth field is absent.

An as_bandwidth_indicator field (1-bit) flags the inclusion of AS bandwidth information. This bit shall be set to '1' to indicate the AS bandwidth field is present, and it shall be set to '0' to indicate the AS bandwidth field is absent.

A FEC_OTI_indicator field (1-bit) indicates whether FEC Object Transmission Information is provided.

A tias_bandwidth field (16-bit) exists when the as_bandwidth_indicator field value is set to '1' and it indicates the maximum bandwidth. Also, it shall be one one-thousandth of the Transport Independent Application Specific maximum bandwidth as defined in RFC 3890, rounded up to the next highest integer if necessary. This gives the TIAS bandwidth in kilobits per second.

An as_bandwidth field (16-bit) exists when the as_bandwidth_indicator field value is set to '1' and it indicates the maximum AS bandwidth. Also, this value shall be the Application Specific maximum bandwidth as defined in RFC 4566. This gives the AS bandwidth in kilobits per second.

A FEC_encoding_id field exits when the FEC_OTI_indicator field value is set to '1' and indicates FEC ID used in corresponding FLUTE session. (FEC encoding ID used in this FLUTE session, as defined in RFC 3926).

A FEC_instance_id field exists when the FEC_OTI_indicator field value is set to '1' and indicates FEC instance ID used in the corresponding FLUTE session. (FEC instance ID used in this FLUTE session, as defined in RFC 3926).

The information necessary to receive FLUTE session is provided by signaling the parameters through the NRT_component_data( ) of the component_descriptor( ) within the component loop.

In other words, according to the time information set by the session_start_time field and the session_end_time field, the corresponding FLUTE session is opened and files and the FDT (File Description Table) that describes the signaling information of the files that configures NRT service (or content) is received. The FDT is used to transmit the list of all the content items, and also provides information necessary in acquiring content item and the files included in the content item.

For example, each file configuring a content item may be identified by using a Content-Location indicated in an FDT of a FLUTE session. The Content-Location indicates an identifier that can identify the corresponding file. Herein, the Content-Location is configured in an anyURI (Uniform Resource Identifier) format. More specifically, the Content-Location value is a locator including the file name.

At this point, a content linkage identifying the corresponding content item may be allocated (or assigned) for each file level or instance level of the FDT. In this case, each file may be identified by using content linkage, transfer object identifier (TOI), and Content-Location values indicated in the FDT of the FLUTE session. Herein, the content linkage corresponds to an identifier that can identify the content item, and the TOI corresponds to an identifier that can identify a transport object, i.e., file being transmitted through the FLUTE session. For example, when the TOI value is equal to '0', the file corresponds to the FDT. More specifically, the TOI value of each file configuring the content item is greater than '0'.

Figure 20:
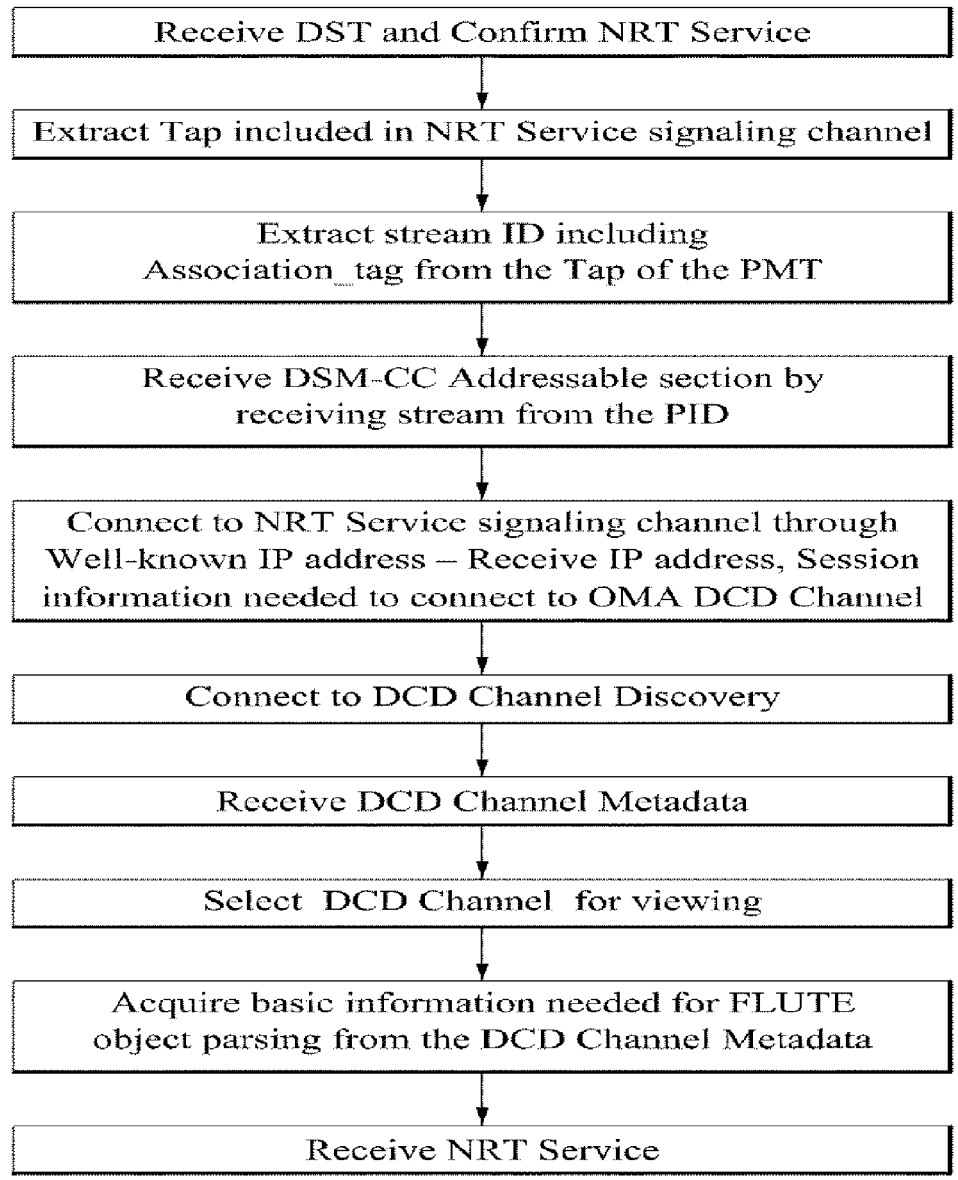
FIG. 20 illustrates a bootstrap sequence through direct delivery of BCAST DCD Channel Discovery information according to the present invention.
Figure 21:
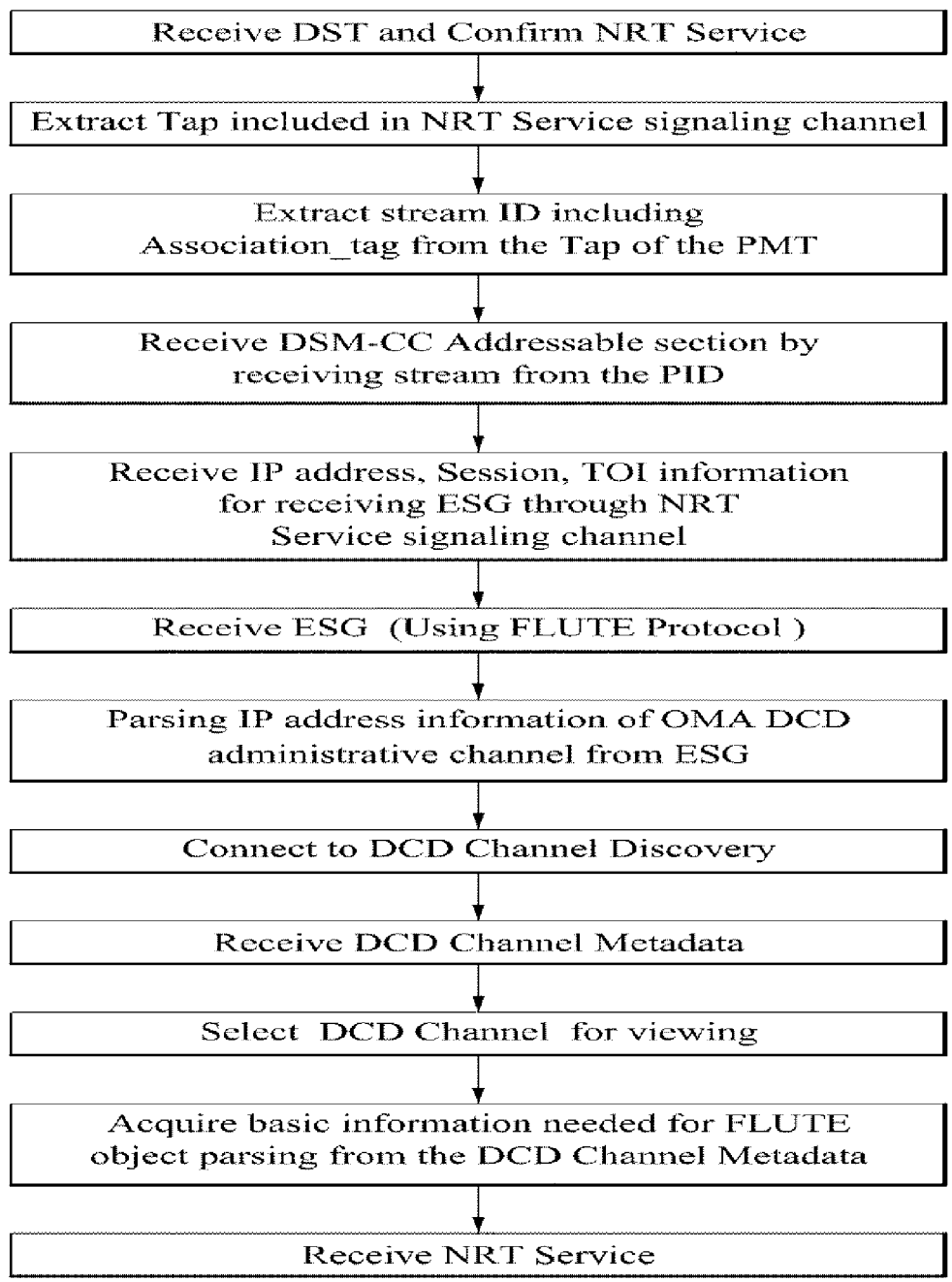
FIG. 21 illustrates a bootstrap sequence using BCAST ESG according to the present invention.

FIG. 20 and FIG. 21 is a sequence illustrating the flow of acquiring DCD Channel information delivered through OMA DCD when receiving NRT Content.

FIG. 20 illustrates a flow sequence of directly delivering the BCAST DCD Channel Discovery information and indicates the sequence after the DST is received. More specifically, DST is received and it is confirmed that NRT Service is included. Then Tap which is included in NRT service signaling channel is extracted. The stream ID including Association_tag in the Tap of PMT is extracted. The DSM-CC addressable section is received by acquiring the stream from the PID. Then through the well-known IP address NRT service channel is connected and then IP address and session information needed to connect to OMA DCD Channel are received. Afterwards, DCD Channel Discovery can be accessed. DCD Channel Metadata is received after accessing the DCD Channel Discovery and the available DCD Channel for viewing is selected. Then basic information needed to parse FLUTE object is acquired from the DCD Channel Metadata. Finally, NRT Service is received.

In FIG. 21, a sequence flow for receiving NRT service by using BCAST ESG is illustrated. First, DST is received and confirmed that NRT service is included. Tap is extracted from the NRT Service signaling channel. Stream ID including Association_tag from Tap of the PMT is extracted. Then, DSM-CC Addressable section is received by receiving the stream from the PID. Next, IP address, Session, TOI information for receiving ESG through NRT Service signaling channel is received. Then ESG is received using the FLUTE protocol. IP address information of OMA DCD administrative channel from ESG is parsed. DCD Channel Discovery is then accessed. DCD Channel Metadata is received and the DCD Channel is selected for viewing. Afterwards, basic information needed for FLUTE object parsing from the DCD Channel Metadata is acquired. Finally, NRT service is received.

Figure 22:
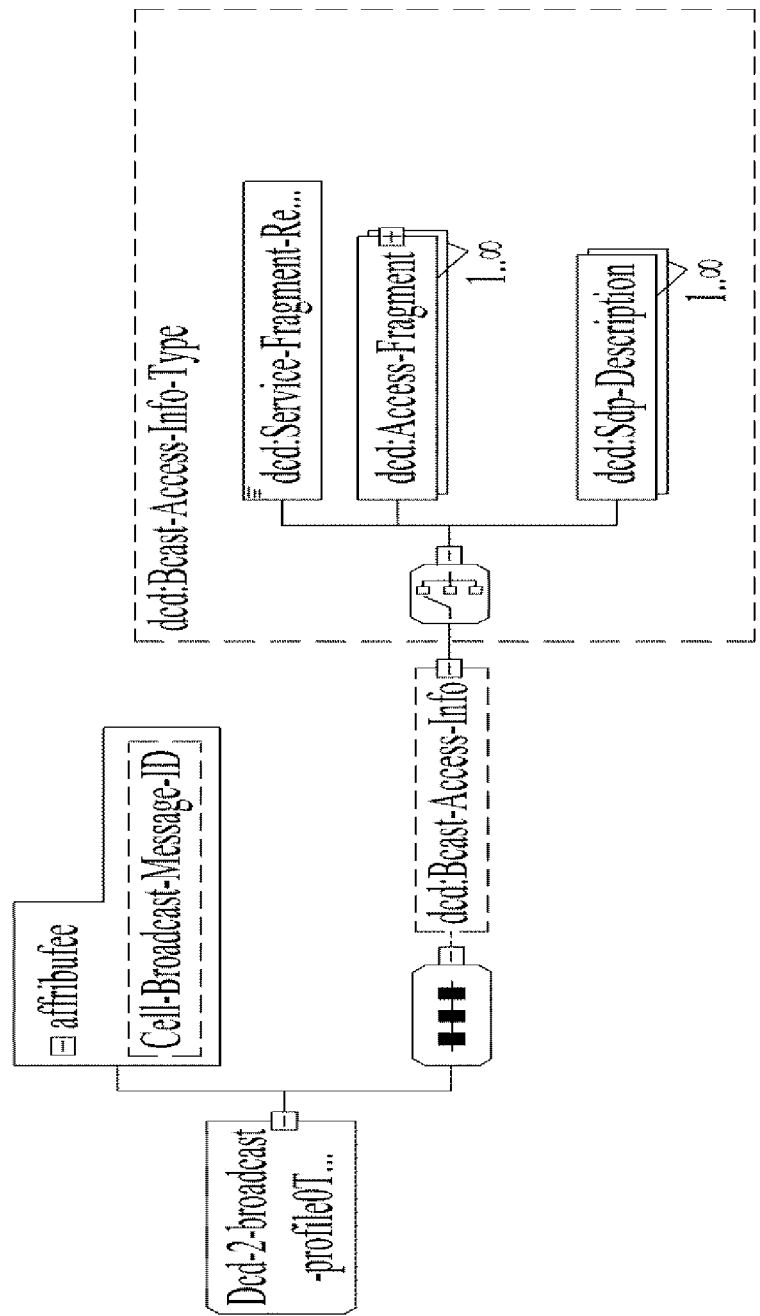
FIG. 22 illustrates an XML schema of OMA DCD DCD-2-broadcast-profile-type according to the present invention.

FIG. 22 illustrates how the channel access information among DCD Channel Metadata in FIG. 21 is achieved through signaling dcd-2-broadcast-profile. There are 3 ways to deliver access information using OMA BCAST. First, using different service as references such as service-fragment-reference in the BCAST Service Guide, it is possible to access the information. Second, by using access-fragment, delivery of perfect form of OMA BCAST Service Guide "Access" Fragment is possible. Lastly, inlining the contents of SDP, it is possible to access the information.

Figure 23:
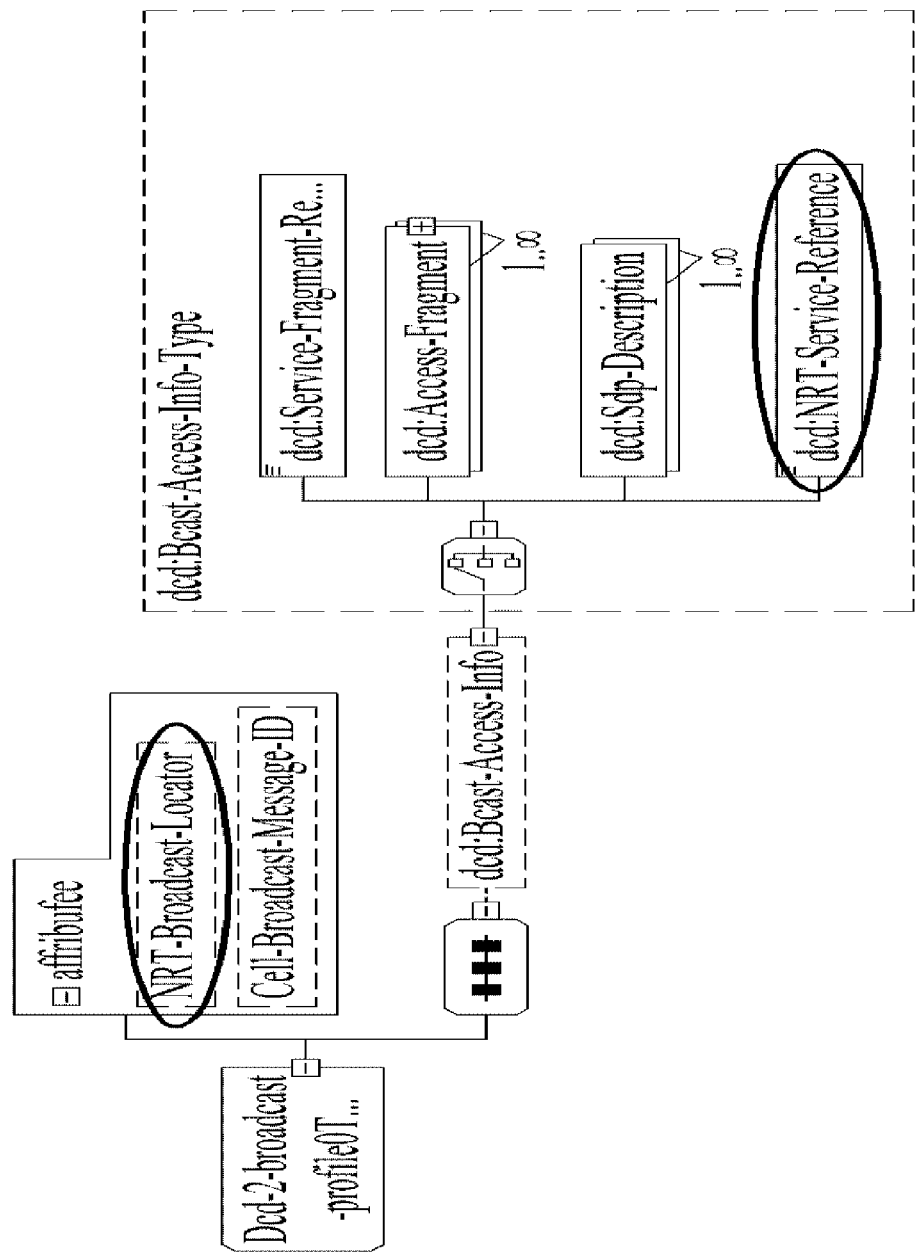
FIG. 23 illustrates an XML schema of OMA DCD DCD-2-broadcast-profile-type according to the present invention.

The present invention proposes as shown in FIG. 23 to expand FIG. 22 to include DCD channel access information delivered through NRT service. First, in order to identify broadcasting stream delivering NRT service, NRT-Broadcast-Locator is included. This information identifies Virtual Channel of ATSC broadcast including NRT service by having an URI structure of "atsc://f=<frequency>.<program_number>[.m=<modulation_format>]".<frequency> indicates the physical bandwidth delivering transport stream of the service and the program number is used to identify the virtual channel. Selectively, modulation format transmitting TS can be signaled together. NRT-service-reference is added to identify NRT service including access information for DCD channel from the NRT service received through the virtual channel. The value of NRT-service-reference is the value of NRT_Service_ID of the NST table and NRT service can be identified.

FIG. 24 illustrates a bitstream syntax structure for NRT_DCD_bootstrap_descriptor( ) configured according to the present invention.

A descriptor_tag is an 8-bit unsigned integer that shall have the value of 0x8E, identifying this descriptor as MH_current_program_descriptor.

A descriptor_length is an 8-bit unsigned integer that shall specify the length (in bytes) immediately following this field up to the end of this descriptor.

A service_id_length is a field that shall specify the length (in bytes) of the service_id_text( ).

A service_id_text( ) is a field that shall give the service id and this value shall be globally unique.

A service_name_text( ) is a field that shall give the service name.

In order to signal BCAST SG through NST, the following method can be used. NRT service included in BCAST SG can be identified by having a value "0x10" for service category and through NST, the access information of announcement channel is provided so the BCAST bootstrap can be performed.

In the above method, NRT DCD channel descriptor including the additional information of DCD content delivery channel can be transmitted by including in the NRT_DCD_channel_descriptor( ).

FIG. 25 illustrates a bitstream syntax structure for NRT_DCD_channel_descriptor. The meaning of the fields in the descriptor are as follows.

A descriptor_tag is an 8-bit unsigned integer that shall have the value 0x8F, identifying this descriptor as MH_current_program_descriptor.

A descriptor_length is an 8-bit unsigned integer that shall specify the length (in bytes) immediately following this field up to the end of this descriptor.

A channel_id_length is a field that shall specify the length (in bytes) of the channel_id_text( ).

A channel_id_text( ) is a field that shall give the channel id. Channel identifier assigned by the DCD Service Provider, to uniquely identify the channel within the DCD Service Provider domain. It is inserted in general channel metadata by the DCD Server.

A channel_name_length is a field that shall specify the length (in bytes) of the channel_name_text( ).

A channel_name_text( ) is a field that shall give the name of the channel. It can be presented to the user in content discovery.

A storage_reservation is a 32-bit unsigned integer that shall specify minimum device storage (in bytes) required for subscription to this channel.

An updated is a 32-bit unsigned integer that shall represent time when the channel metadata was last updated as the number of GPS seconds since 00:00:00 UTC, Jan. 6, 1980.

A content_types_length is a field that shall specify the length (in bytes) of the content_types_text( ).

A content_types_text( ) is a field that shall give a comma-separated list of strings that describe the type of channel content e.g. by "category", "tag" or "relation".

A mime_types_length is a field that shall specify the length (in bytes) of the mime_types_text( ).

A mime_types_text( ) is a field that shall give a comma-separated list of MIME types for content items in the offered channel.

A charging_rules_length is a field that shall specify the length (in bytes) of the charging_rules_text( ).

A charging_rules_text( ) is a field that shall give Information that at least defines who is responsible for the channel charging and the charging method (based on subscription or consumption).

A num_purchase_options is an 8 bit field that shall specify the number of purchase options in this DCD channel descriptor.

A purchase_option_id_length is a field that shall specify the length (in bytes) of the purchase_option_id_text( ).

A purchase_option_id_text( ) is a field that shall give a Identifier of the purchase option, that will be used to identify the selected option.

A cost_information_flag is a 1-bit Boolean flag that shall indicate, when set to '1', that the cost_information is present for this component.

A price_information_flag is a 1-bit Boolean flag that shall indicate, when set to '1', that the amount and currency is present for this component.

A cost_information_length is a field that shall specify the length (in bytes) of the cost_information_text( ).

A cost_information_text( ) is a field that shall give a Identifier of the purchase option, that will be used to identify the selected option.

An amount is a 32-bit float that shall specify the monetary value of the price for this purchase option.

A currency is a 16-bit unsigned integer that shall specify the monetary currency codes defined in ISO 4217 international currency codes.

Figure 26:
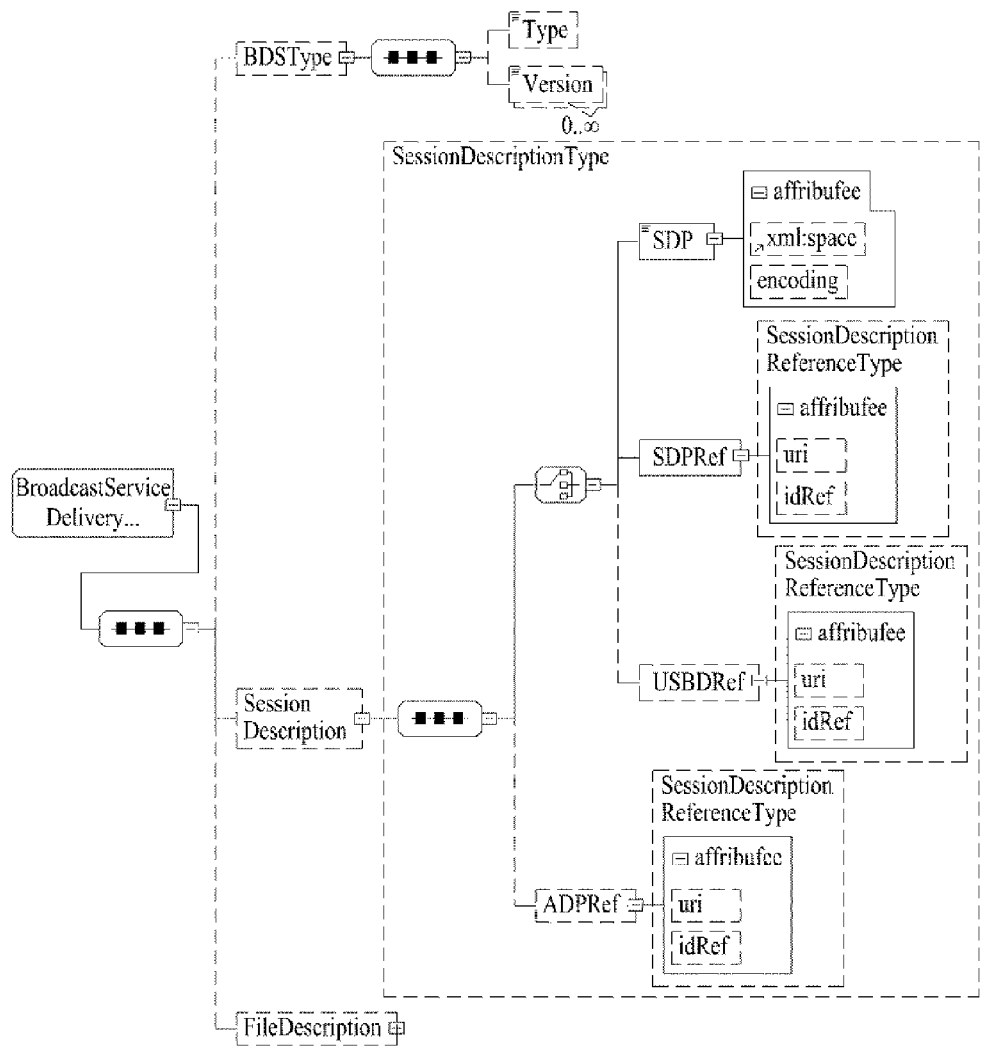
FIG. 26 illustrates an XML schema of OMA BCAST SG Broadcast service delivery according to the present invention.
Figure 27:
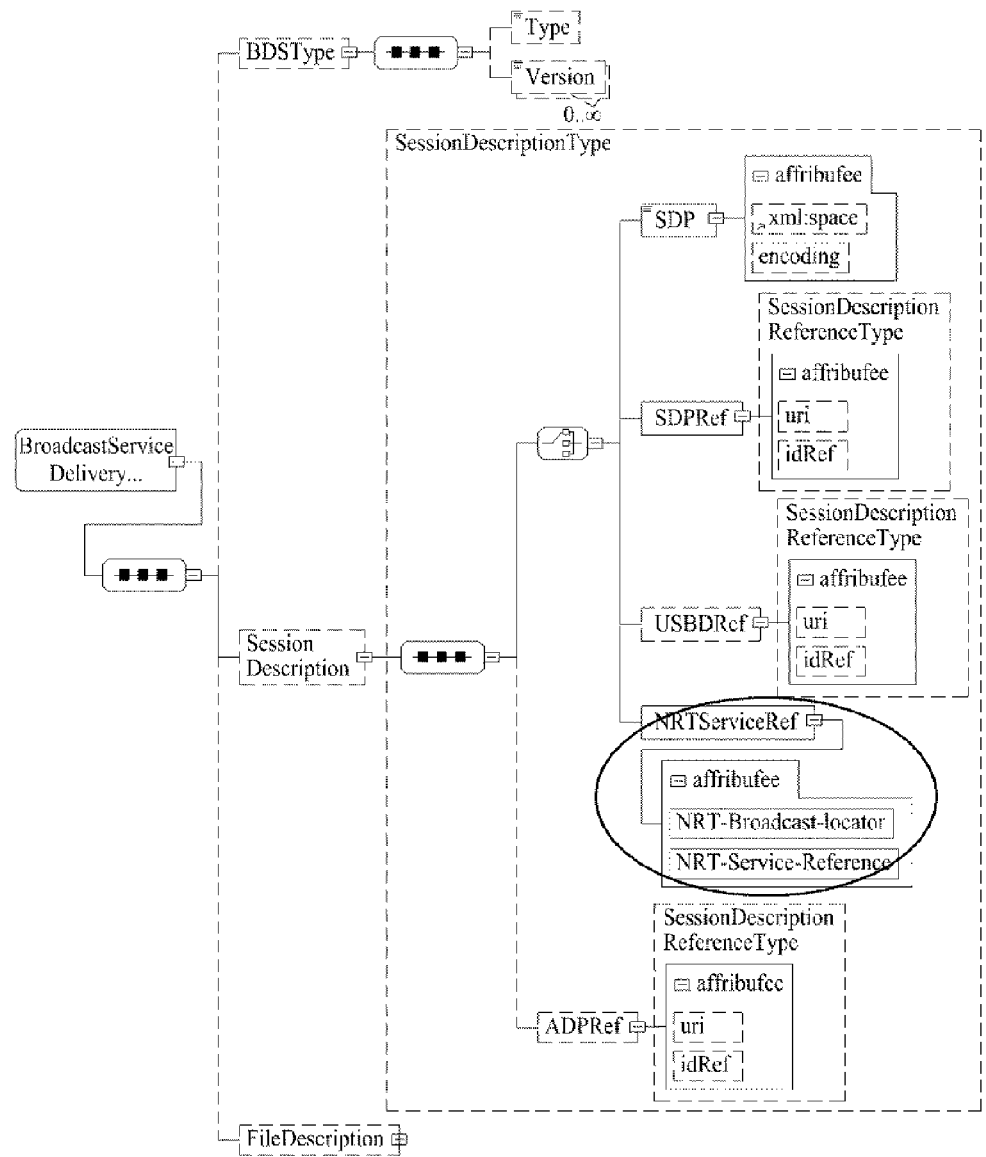
FIG. 27 illustrates an XML schema of OMA BCAST SG Broadcast service delivery configured to provide connection information through NRT service proposed according to the present invention.

The access information of service delivery through Broadcast is provided through Broadcast service delivery structure as illustrated by FIG. 26. And the present invention proposes an expanded version as illustrated by FIG. 27 to provide access information of NRT service. As illustrated in FIG. 27, NRT ServiceRef element is added in the Session Description so that NRT service is referenced. And the NRT-Broadcast-Locator is expanded as follows to identify NRT service in one URI: atsc://f=<frequency>.<program_number>[.m=<modulation_format>][/<NRT_Service_ID>]

FIGS. 28 and 29 are diagrams of a bit-stream syntax of an NRT Information Table (NRT-IT) section to identify an NRT application configured according to an embodiment of the present invention.

The information provided in the NRT-IT includes the title of the content (for example, the name of the program available for download), the times during which the content is to be made available for download, and information such as content advisories, availability of caption services, content identification, and other metadata. One item of content may consist of one or more files. For example, an audio/video clip may come with a JPEG thumbnail image that can be used to represent it in on-screen displays.

An instance of the NRT-IT can include data corresponding to an arbitrarily defined time period, or can describe NRT content starting at a specified time and into the indefinite future. Each NRT-IT instance indicates the start time of the period it covers and the length of the period it covers (which may be indefinite). Each NRT-IT instance may be segmented into as many as 256 sections. One section may contain information for multiple content items, but the information for any given content item shall not be segmented and put into two or more sections.

Any content item to be made available for download for a time interval that extends beyond the time period covered one or more NRT-IT instances shall be described only in the first of these NRT-ITs. Content item descriptions are placed within the NRT_information_table_section( ) in the order of their first availability. Therefore, when last_section_number is greater than zero (meaning the NRT-IT is delivered in multiple sections), for sections other than the first (sections for which the value of section_number is greater than zero), all the content item descriptions within a given section shall have first availability times that are greater than or equal to all first availability times of content item descriptions in the immediately preceding section (the section whose value of section_number is one lower than the given section).

Each NRT-IT identifies NRT services associated with the given value of service_id available on a particular virtual channel sometime during the time period it covers.

A table_id field (8-bit) is set to 0xTBD to identify this table section as belonging to the Non-Real-Time Information Table.

A service_id field (16-bit) specifies the service_id field associated with the NRT service offering content items described in this section.

An NRT_IT_version_number field (5-bit) indicates the version number of this NRT-IT instance, where NRT-IT instance is defined as the set of one or more NRT_information_table_section( ) having common values for service_id field, current_next_indicator field, protocol_version field, and time_span_start field. The version number is incremented by 1 modulo 32 when any field in the NRT-IT instance changes.

A current_next_indicator (1-bit) field is always set to '1' for NRT-IT sections; the NRT-IT sent is always currently applicable.

A protocol_version field (8-bit) is set to zero. The function of protocol_version field is to allow, in the future, this table type to carry parameters that may be structured differently than those defined in the current protocol. At present, the only valid value for protocol_version field is zero. Non-zero values of protocol_version field may be used by a future version of this standard to indicate structurally different tables.

A time_span_start field (32-bit) represents the start of the time span covered by this instance of the NRT-IT, expressed as the number of GPS seconds since 00:00:00 UTC, Jan. 6, 1980. The time of day of time_span_start field is aligned to minute 00 of the hour. The value zero for time_span_start field indicates the time period covered by his NRT-IT instance began in the indefinite past. The value of time_span_start field is the same for each section of a multi-sectioned NRT-IT instance. The values of time_span_start field and time_span_length field are set such that the specified time span does not overlap with any other NRT-IT instance in this IP subnet.

A time_span_length field (11-bit) indicates the number of minutes, starting at the time indicated by time_span_start field, covered by this instance of the NRT-IT. Once established, the value of time_span_length field for a given value of time_span_start field does not change. A value of time_span_length field of zero means this NRT-IT instance covers all time starting at time_span_start field into the indefinite future. If the value of time_span_start is zero, time_span_length field has no meaning. The value of time_span_length field is the same for each section of a multi-sectioned NRT-IT instance. The values of time_span_start field and time_span_length field are set such that the specified time span does not overlap with any other NRT-IT instance in this IP subnet.

A num_items_in_section field (8-bit) indicates the number of content items described in this NRT-IT section.

A content_linkage field (32-bit) in the range 0x0001 to 0xFFFFFFFF specifies the identification number of the content (or content item) described. Value 0x0000 is not used. The content_linkage field performs two linkage functions: it links metadata in the NRT-IT to one or more files in the FLUTE FDT associated with this NRT service; it also forms the TF_id field (identifier for Text Fragment in Text Fragment Table). The value of the content_linkage field corresponds to either the value of one of the FDT-Content-Linkage elements or the value of one of the File-Content-Linkage elements in the FLUTE FDT for each file associated with the content item. The precedence rules may be applied when matching each content_linkage value with the corresponding content linkage elements in the FLUTE FDT.

A TF_available field is Boolean flag, this field specifies, when set to '1' that a Text Fragment is present in a Text Fragment Table in the service signaling channel. When the field is set to '0,' no Text Fragment is included in the service signaling channel for this content item.

An available_on_internet is a 1-bit flag that indicates when files of the content item can be accessed by internet. When this field is set to '1', it shall indicate that all the files belonging to this content item are available on the Internet, and that the Content-Location attribute in the FLUTE FDT for each file belonging to this content item indicates the internet URL of that file.

A low_latency field is Boolean flag, this field specifies, when set to '1,' that the content is available within the current digital transport with a low enough latency that its retrieval should be attempted while the user waits. When the field is set to '0', retrieval latency is longer and the user interface should suggest to the user to return later for viewing.

A playback_length_in_seconds field (20-bit) specifies the duration of playback of the content, in seconds. For content consisting only of text and/or still images, the value zero is used. For content that includes audio or audio/video content, the playback_length_in_seconds field indicates the playback length of the audio or audio/video content.

A content_length_included field is Boolean flag, this field indicates, when set to '1,' that the content_length field is present in this iteration of the "for" loop. Setting this field to '0' indicates the content_length field is not present in this iteration of the "for" loop.

A playback_delay_included field is Boolean flag, this field indicates, when set to '1,' that the playback_delay field is present in this iteration of the "for" loop. Setting this field to '0' indicates the playback_delay field is not present in this iteration of the "for" loop.

An expiration_included field is Boolean flag, this field indicates, when set to '1,' that the expiration field is present in this iteration of the "for" loop. Setting this field to '0' indicates the expiration field is not present in this iteration of the "for" loop.

A duration field (12-bit) in the range 1 to 2880 specifies the expected cycle time, in minutes, of the carousel containing the referenced content item. A broadcast receiver is expected to use the duration parameter to determine the amount of time needed to capture the referenced content.

A content_length field (40-bit), when present, represents the total size in bytes of the content item or items. This item is used by the broadcast receiver to determine if enough memory is available to store it before downloading is attempted.

A playback_delay field (20-bit) counts of the number of seconds following reception of the first byte of the associated content the broadcast receiver waits before playback may start, while buffering the incoming stream. A value of zero indicates playback may commence immediately. When playback_delay field is not provided, the broadcast receiver is expected to retrieve the complete file or file set prior to playback.

An expiration field (32-bit) represents the expiration time of the content, expressed as the number of GPS seconds since 00:00:00 UTC, Jan. 6, 1980. Following expiration, the content is deleted from memory. If an expiration time is not specified, broadcast receivers are expected to use methods of their own choosing to manage memory resources.

A content_name_length field (8-bit) specifies the length (in bytes) of the content_name_text( ).

A content_name_text( ) field specifies the content item title in the format of a multiple string structure.

A content_descriptors_length field (12-bit) indicates the total length (in bytes) of the content_descriptor ( ) that provide additional information about the content level.

A content_descriptor( ) is separately applied to each content item. The Receiver Targeting Descriptor configured according to an embodiment of the present invention will be inserted in this descriptor loop. The description of the Receiver Targeting Descriptor will be explained below with FIG. 16.

A descriptors_length field (10-bit) indicates the total length (in bytes) of the descriptor ( ).

A descriptor( ) is commonly applied to all content items described in the current NRT-IT section.

FIG. 30 and FIG. 31 illustrate an FDT XML (eXtensible Markup Language) schema configured according to the present invention.

When FDT or FDT instance needs to define attribute for the files that are all announced, it is defined at the FDT instance level and if the attributes are needed to be defined separately, it is defined in the FDT file level.

In FIG. 30, the number 1 indicates content linkage in the FDT instance level and the announced content linkage is given all the files in the corresponding FDT instance. However, it is possible to override this information by granting new content linkage in the file level as well. Also, if a particular file is defined in a different context from the content or context defined in the FDT instance level, the content linkage is granted in the file level.

The number 2 in FIG. 30 indicates content linkage announced when the files included in the FDT instances belongs to a different context and how signaling is done for each files in different context.

The number 3 in FIG. 31 indicates whether each file belong to an entry file or not. In other words, entry file indicates that it is the first file to be accessed among other files that make up content and it is the first root file that needs to be executed. It is possible to omit entry attribute and when the value is false and the attribute is omitted, the corresponding file is not an entry file.

According to the present invention, when the file element is available through the internet, it is indicated as in number 4 of FIG. 31. The Content-Location attribute includes the internet address for the file.

For example, the Content-Location attribute in FLUTE FDT corresponding to each file in the content item is indicated by the Internet URL of that file. Therefore, it is possible for a content to be downloaded through the FLUTE session or downloaded through the internet.

In the present invention, a single reserved bit in the content item loop of the NRT-IT is used to signal that the files of that content item are available on the Internet. When this bit is set, the FLUTE FDT Content-Location fields for the files which constitute this content item are required to be URLs that can be used to retrieve the files via the Internet. Thus, when this bit is set, an NRT device with an Internet connection can parse the FDT to identify which files constitute the content item and find out the URL for each such file, thereby allowing it to download them directly from the Internet. The primary advantage of this method is a savings in bandwidth. However, it does not allow some files of a single content item to be available on the Internet, while other files of the same content item are only available in the broadcast stream. This method also requires that NRT devices check the FLUTE FDT in order to get the URLs of the files available on the Internet. The NRT devices are required to check the FDT in any case, since they need to know the complete list of the files in the content item, and they cannot be sure that the set of Content Location Descriptors for a content item gives a complete list.

Figure 32:
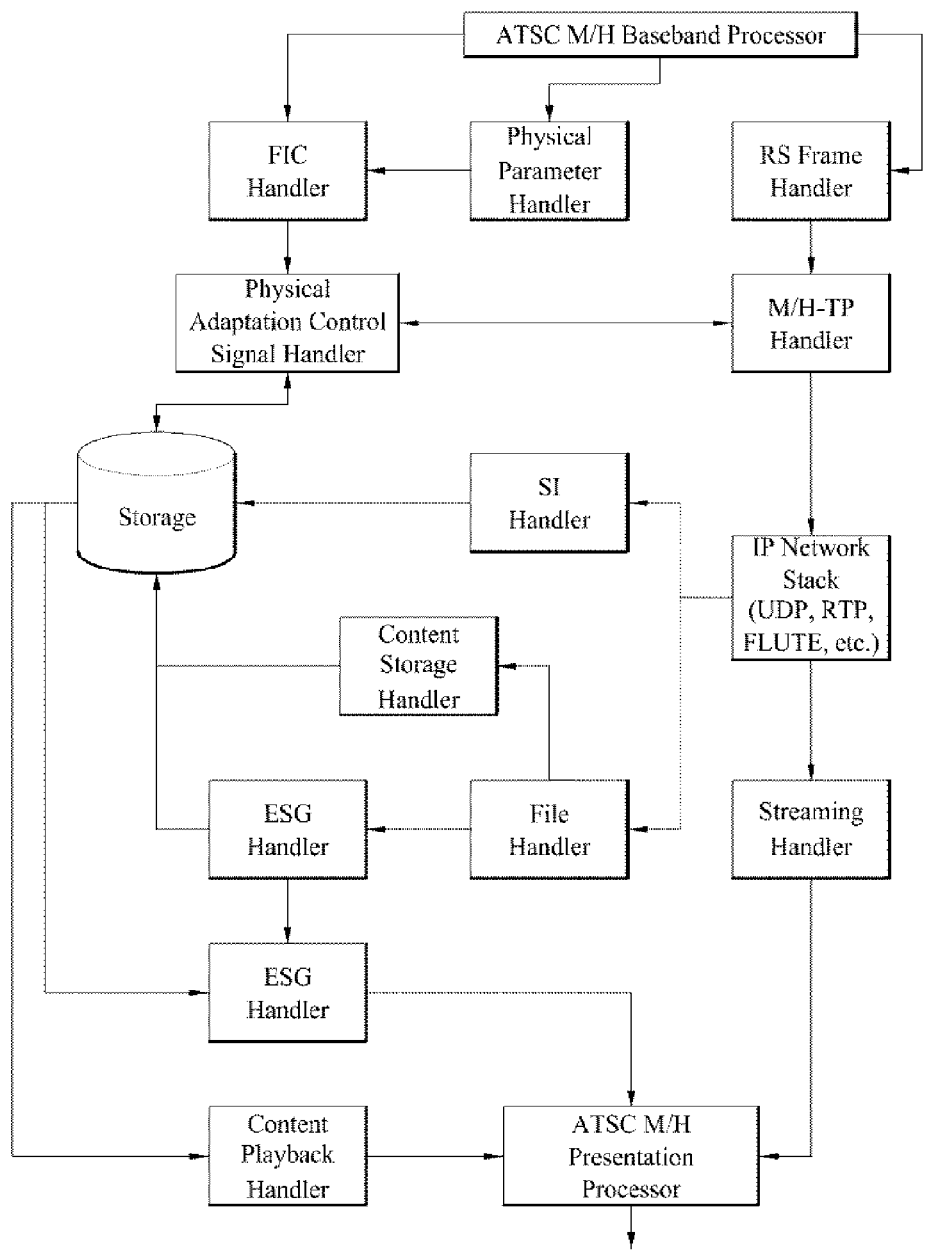
FIG. 32 is a block diagram of ATSC M/H receiver configured according to the present invention.

FIG. 32 is a block diagram of how the ATSC-M/H mobile receiver receives NRT service. In a ATSC-M/H mobile receiver, the audio, video, graphic, text data are received through NRT. The contents are saved through signaling and announcement data using SMT, OMA BCAST SG.

The ATSC Mobile DTV Standard, A/153 Part 5, specifies an Application Framework based on the Open Mobile Alliance (OMA) Rich Media Environment (RME). This Application Framework consists of the following OMA RME components: Scene descriptions, Scene commands, Inline scripting, Event handling, Timing and processing model, Packaging and delivery, and Static and dynamic device capabilities. The scene descriptions are based on the World Wide Web Consortium (W3C) Scalable Vector Graphics (SVG) Tiny 1.2 specification. Scene descriptions can use the graphics constructs that are part of the SVG Tiny 1.2 specification, and they can reference media objects to be embedded in the scenes. References to such media objects are in the form of "Internationalized Resource Identifiers" (IRIs), which are generalized URIs in which international character sets can be used.

A/153 Part 5 requires that the scene descriptions and scene commands themselves be delivered in the form of "streamed sequences of RME Units" as defined in the OMA RME specification, which means that the scene descriptions and scene commands are delivered via RTP. However, A/153 Part 5 does not specify how media objects referenced in such scene descriptions are to be delivered. One well-known way to deliver small media objects is to put them in-line in the scene descriptions themselves, using the "data" URI scheme defined in IETF RFC 2397. Another well-known way to deliver media objects is as files over a two-way IP connection using some protocol such as HTTP or FTP, for those mobile devices that have such a connection. Yet another known way to deliver media objects is as files via the FLUTE delivery mechanisms specified in section 5 of this NRT standard.

The following requirements are intended to minimize the adaptations that need to be made to RME processors to handle media objects delivered via FLUTE, when the RME processors were originally built to retrieve them via a two-way IP connection.

When a media object is delivered as a file via FLUTE and is also available as a file delivered over a two-way IP connection, the value of the Content-Location element for the file in the FLUTE FTD shall be identical to the URL that could be used to retrieve the file over the two-way IP connection.

And when a media object is delivered as a file via FLUTE and is not available as a file delivered over a two-way IP connection, the value of the Content-Location element for the file in the FLUTE FTD shall be a URI conforming to the "tag" URI scheme defined in IETF RFC 4151.

These requirements make it relatively easy to take an RME processor that was built to get media objects from a two-way IP connection, and adapt it so that it can utilize media objects delivered via FLUTE, assuming the RME processor follows the practice of having a browser-like cache where it caches retrieved files so that it does not have to repeatedly retrieve the same file each time it is referenced.

The RME client can simply be interfaced to a FLUTE client that deposits files delivered via FLUTE into the RME processor's cache, labeling each file with its FLUTE FDT Content-Location value as the URI that was used to retrieve it. When the RME processor encounters in a scene description a URI that references a media object, it looks first in its cache to see if it has a file there labeled with that URI. If so, it can just use that file. If it does not have a file in its cache labeled with that URI, there are two cases to consider. If the URI is not a "tag" URI, the RME processor can retrieve the file over its two-way IP connection. If the URI is a "tag" URI, the RME processor knows it must wait for the file to be delivered via FLUTE.

The URL conventions specified in this section are intended to accomplish three things which are enabling receivers to distinguish between files that are only available via FLUTE and files that are available via both FLUTE and an Internet link, facilitating using relative URLs for files delivered by FLUTE, rather than longer absolute URLs, and supporting hyperlink resolution among the files within a FLUTE session in much the same way as it works for files in a computer's file system.

The first URL conventions is when a file is available both via FLUTE and over the Internet, the value of the Content-Location element of the file in the FLUTE FDT shall match the URL used to access the file over the Internet.

The second URL convention is the Content-Location value for a FLUTE file may be an absolute URL or a relative URL. If the Content-Location value is an absolute URL, that URL is the absolute URL for the file. If the Content-Location value is a relative URL, the file shall be deemed to have an absolute URL of form: file://X/<content-location> where <content-location> is its Content-Location value, and "X" is an arbitrary virtual folder designation that represents the FLUTE session delivering the file and is disjoint from the virtual folders of all other FLUTE sessions known to the receiver. Since the folder designation is unspecified, it is only possible to reference such a file via relative hyperlinks that come from within the same FLUTE session. Moreover, because of condition (1), such a file cannot be available via an Internet link.

The third URL convention is the "tag" URI scheme defined in RFC 4151 [65] may be used for the Content-Location value of FLUTE files, with the added constraint that the "specific" part of the URL shall conform to the syntax and semantics of the <hier_part> of an absolute URI, as that term is defined in RFC 2396[40]. Note that such a file can be referenced from anywhere, since a "tag" URI is required by RFC 4151 [65] to be globally unique, but as with any FLUTE file the engine resolving the reference needs to know a set of FLUTE session(s) in which to look for the file. Note also that such a file cannot be available over the Internet, because of condition the first URL convention.

The fourth URL convention is FLUTE files that are not available over the Internet should have either a relative URL or an absolute "tag" URI as their Content-Location value. The base URI for resolving relative hyperlinks within a FLUTE file shall be the absolute URL of the file, as defined in the second URL convention above, with the last path segment removed. An absolute URL of type 1 or 3 may be used as a reference to the file from anywhere, including from within a file that is part of a different content item from the referenced file. The same absolute URL of type 1 or 3 may be used as the Content-Location for files delivered in different services (i.e., separate FLUTE sessions. In this case, the file delivered must be the same.)

FIG. 32 is a block diagram of how the ATSC-M/H mobile receiver receives NRT service. In a ATSC-M/H mobile receiver, the audio, video, graphic, text data are received through NRT. The contents are saved through signaling and announcement data using SMT, OMA BCAST SG.

Using RTP protocol the RME data is received and the specific A/V object or other graphic, text data are called on by performing the command. The A/V object called on, in this case are stored NRT content. The ID value needed to call the NRT content is the Content-Location field value of the FLUTE FDT in the NRT file stored.

Figure 33:
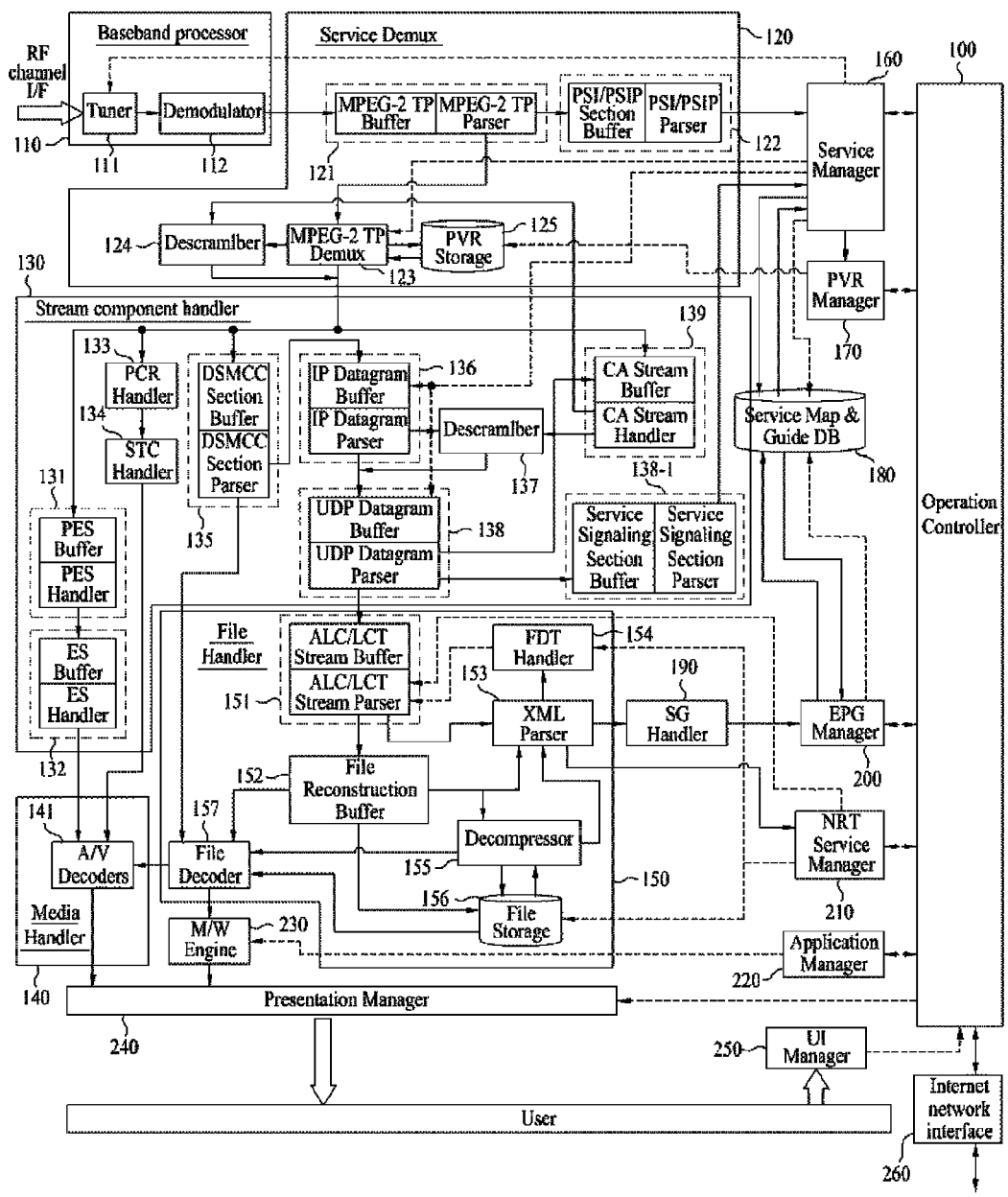
FIG. 33 is a block diagram of broadcast receiver configured to receive Fixed NRT service according to the present invention.

FIG. 33 illustrates a block diagram showing a structure of a broadcast receiver for fixed NRT services according to an embodiment of the present invention.

The broadcast receiver in FIG. 33 includes an Operation Controller 100, a Baseband processor 110, a Service Demultiplexer 120, a Stream component handler 130, a Media Handler 140, a File Handler 150, a Service Manager 160, a PVR Manager 170, a first storage unit 180, an SG Handler 190, an EPG Manager 200, an NRT Service Manager 210, an Application Manager 220, a MiddleWare Engine 230, a Presentation Manager 240, a UI Manager 250, and an internet network interface (260).

The Baseband processor 110 includes a Tuner 111 and a Demodulator 112. The Service Demultiplexer 120 includes an MPEG-2 TP Handler 121, a PSI/PSIP Handler 122, a Demultiplexer 123, a Descrambler 124 and a second storage unit 125.

The Stream component handler 130 includes a Packetized Elementary Stream (PES) decoder 131, an Elementary Stream (ES) decoder 132, a PCR Handler 133, an STC Handler 134, a DSM-CC Addressable Section Handler 135, an IP Datagram Handler 136, a Descrambler 137, a UDP Handler 138, a Service Signaling Section Handler 138-1, and a Conditional Access System (CAS) 139.

The Media Handler 140 includes an A/V Decoders 141. The File Handler 150 includes an ALC/LCT Stream Handler 151, a File Reconstruction Buffer 152, an XML Parser 153, an FDT Handler 154, a Decompressor 155, a third storage unit 156, and a File Decoder 157.

The Tuner 111 for example in FIG. 16 detects signal transmitted over the terrestrial system with the control from the Service Manager 160 and tunes only the wanted channel, down converts to Intermediate Frequency (IF), and outputs to the Demodulator 112. The Tuner 111 may receive both real time stream and non-real time stream. In the present invention, non-real time stream is referred to as NRT stream.

The Demodulator 112 receives digital IF signal of pass bandwidth inputted from the Tuner 111 and performs automatic gain control, reconstructs carrier frequencies and timing to convert into baseband signal and equalizes the channel. For example, if the broadcast signal is a VSB modulated signal, a VSB demodulation process is executed for automatic gain control, and reconstructs carrier frequencies and timing. In the Demodulator 112, demodulated and equalized channel data is outputted to the MPEG-2 TP Handler 121 in a MPEG-2 Transport Stream (TS) packet format.

The MPEG-2 TP Handler 121 is configured of an MPEG-2 TP Buffer and an MPEG-2 TP Parser, temporarily stores the Demodulator 112 output and then analyzes TS Header, and outputs to the Demultiplexer 123 if the Demodulator 112 output is a real time A/V TS packet or NRT TS packet and outputs to the PSI/PSIP Handler 122 if the output is a TS packet for PSI/PSIP table. The PSI/PSIP Handler 122 is configured of a PSI/PSIP Section Buffer and a PSI/PSIP Parser, and temporarily stores the outputted TS packet from the MPEG-2 TP Handler 121 to reconstruct the corresponding table from PSI/PSIP Section data included in the payload of TS packet with referencing table identifier and then parse it. At this time, it is possible to find out whether one table is configured by one section or plurality of sections by the table_id field, section_number field, and last_section_number field within the corresponding section. Further, completing the corresponding table is possible by gathering sections having identical table identifiers. For example, it is possible to complete a VCT by gathering the sections having table identifiers allocated to VCT. Also, each of the parsed table information is collected by the Service Manager 160 and then stored in the first storage unit 180. The VCT, PAT, PMT, DST, EIT, ETT and the like, are stored in the first storage unit 180 after going through the process. The Service Manager 160 stores the table information in the first storage unit 180 in the Service Map & Guide DB format.

According to an embodiment of the present invention, a service_type field within the VCT is used to identify a corresponding service as an NRT service (or NRT service signaling channel), and the PAT and PMT are used to extract a PID value of an MPEG-TS packet, which transmits the NRT service (or NRT service signaling channel). Such extraction procedure is performed in the service manager 160 by using the output of the PSI/PSIP handler 122. And, herein, the extracted PID is provided to the MPEG-2 TS handler 121.

The Demultiplexer 123 divides audio TS packet and video TS packet and then outputs to the PES Decoder 131 if the TS packet is real time A/V TS packet and outputs to the DSM-CC Handler 135 if it is an NRT TS packet. Also, the Demultiplexer 123 outputs to the PCR Handler 133 if the TS packet includes Program Clock Reference (PCR) and outputs to the CAS 139 if the TS packet includes Conditional Access (CA) information. The NRT TS packet is divided into TS packet including NRT service data and TS packet including NRT service signaling channel. A unique PID is allocated to identify the NRT service in the TS packet of the NRT service data and the PID of the TS packet including the NRT service signaling channel is extracted using VCT, PAT, and PMT.

The Demultiplexer 123 outputs to the Descrambler 124 if the payload of the inputted TS packet is scrambled and the Descrambler 124 receives descrambling information needed for descrambling (for example, control word used in scrambling) from the CAS 139 and performs descrambling of the TS packet.

The Demultiplexer 123 stores A/V packet of real time from any one of the record, timed-record, or time shift request in the second storage unit 125. The second storage unit 125 is a mass storage device, an example of it can be a HDD. The download (storage) and upload (playing) in the second storage unit 125 is controlled by the PVR Manager 170 or the Service manager 160.

In accordance with a playback request, the demultiplexer 123 separates an audio TS packet and a video TS packet from an A/V TS packet uploaded from the second storage unit 125, thereby outputting the separated TS packets to a PES decoder 131.

The Demultiplexer 123, in order to perform such functions, is controlled by Service Manager 160 and/or PVR Manager 170.

More specifically, when the service_type field value within the VCT indicates that an NRT service (or NRT service signaling channel) is being transmitted, the service manager 160 uses the PAT and the PMT to extract a PID value of an MPEG-TS packet, which transmits the NRT service (or NRT service signaling channel). Then, the service manager 160 outputs the extracted PID value to the MPEG-2 TP handler 121 and the demultiplexer 123.

The demultiplexer 123 outputs the MPEG-2 TS packets, which correspond to the PID outputted from the service manager 160, to the addressable section handler 135.

The PCR is a standard time value used in syncing audio ES and video ES in the A/V Decoder 141. The PCR Handler 133 outputs to STC Handler 134 reconstructed PCR included in the payload of the inputted TS packet. The STC Handler 134 outputs to the A/V Decoder 141 reconstructed System Time Clock (STC) which is the standard clock from the system by the PCR.

The PES Decoder 131 is configured with a PES Buffer and a PES Handler, temporarily stores audio TS packet and video TS packet and removes TS header from each TS packet and reconstructs to audio PES and video PES. The reconstructed audio PES and video PES is outputted to the ES Decoder 132. The ES Decoder 132 is configured with an ES Buffer and an ES Handler, removes each PES header from audio PES and video PES and reconstructs audio ES and video ES which are pure data.

The A/V Decoder 141 uses each decoding algorithms to decode the audio ES and video ES and reconstructs to pre-compressed status and then outputs to the Presentation Manager 240. At this point, depending on the STC, the time sync is executed when audio ES and video ES are decoding. In one example, the audio decoding algorithm may apply at least one of AC-3 decoding algorithm, MPEG 2 audio decoding algorithm, HE AAC decoding algorithm, AAC SBR decoding algorithm, AAC+ decoding algorithm, HE AAC decoding algorithm, AAC SBR decoding algorithm, MPEG surround decoding algorithm, or BSAC decoding algorithm, and the video decoding algorithm may apply at least one of MPEG 2 video decoding algorithm, MPEG 4 video decoding algorithm, H.264 decoding algorithm, SVC decoding algorithm, and VC-1 decoding algorithm.

The CAS 139 is configured with a CA Stream Buffer and a CA Stream Handler, and the TS packet outputted from the MPEG-2 TP Handler 121 or the service protection data reconstructed and outputted from the UDP Datagram Handler 138 is temporarily stored and then reconstruct the needed information (control word used in scrambling) to descramble the stored TS packet or the service protected data. Thus, the CAS 139 acquires necessary information to descramble after extracting the Entitlement Management Message (EMM) and Entitlement Control Message (ECM) included in the payload of the TS packet, and then by analyzing the extracted EMM and ECM. The ECM may include the Control Word (CW) used in scrambling. The CW may be encrypted using the authentication key. The EMM may include authentication key of the corresponding data and the requirements information. The acquired information necessary for descrambling from the CAS 139 will be outputted to the Descramblers 124, 137.

The DSM-CC Section Handler 135 is configured with a DSM-CC Section Buffer and a DSM-CC Section Parser, temporarily stores the TS packet outputted from the Demultiplexer 123 and then reconstructs the addressable section included in the payload of the TS packet, and outputs to the IP Datagram Handler 136 after removing the header and the CRC checksum from the addressable section and then reconstructing the IP Datagram. The IP Datagram Handler 136 is configured with an IP Datagram Buffer and an IP Datagram Parser, and after buffering the IP datagram delivered from the DSM-CC Section Handler 135, extracts and analyzes the header of the buffered IP datagram and then outputs to the UDP Datagram Section Handler 138 after reconstructing the UDP datagram from the payload of the IP datagram.

At this point, if the IP datagram is scrambled, the scrambled UDP datagram is descrambled in the Descrambler 137 and then outputted to the UDP Datagram Handler 138. In one example, the Descrambler 137 gathers information needed for descrambling (for example, control words needed for scrambling) from the CAS 139 and descrambles the UDP datagram and then outputs to the UDP Datagram Handler 138.

The UDP Datagram Handler 138 is configured with UDP Datagram Buffer and UDP Datagram Parser, and after buffering the UDP datagram outputted from the IP Datagram Handler 136 or the Descrambler 137, extracts and analyzes the header of the buffered UDP datagram and reconstructs the data included in the payload of the UDP datagram. At this point, if the reconstructed data is service protection data then it is outputted to the CAS 139 and if it is NRT service signaling data, then it is outputted to the service signaling section handler 138-1, and if it is NRT service data then it is outputted to the ALC/LCT stream handler 151.

In an embodiment, the access information of the IP datagram transmitting NRT service signaling channel is a well-known destination IP address and well-known destination UDP port number.

Therefore, the IP Datagram Handler 136 and UDP Datagram Handler 138 has well-known destination IP multicast address and well-known destination UDP port number, and the IP multicast stream which transmits NRT service signaling channel, extracts the NRT service signaling data and outputs to the Service Signaling Section Handler 138-1.

Additionally, the service signaling section handler 138-1 is configured of a service signaling section buffer and a service signaling section parser. Herein, the service signaling section handler 138-1 recovers and parses NST, as shown in FIG. 5 and FIG. 6, and NRT-IT, as shown in FIG. 9, from the NRT service signaling data, thereby outputting the processed data to a service manager 160. When the NST is parsed, access information of a FLUTE session, which transmits contents/files configuring the NRT service, may be obtained. The information parsed from the NST and the NRT-IT is collected (or gathered) by the service manager 160, thereby being stored in the first storage unit 180. The service manager 160 stores the information extracted from the NST and the NRT-IT in the first storage unit 180 in the form of a service map and a service guide. According to another embodiment of the present invention, the function (or role) of the service manager 160 may be performed by an NRT service manager 210. More specifically, the information parsed from the NST and the NRT-IT may be collected (or gathered) by the NRT service manager 210, so as to be stored in the first storage unit 180.

The ALC/LCT Stream Handler 151 is configured with an ALC/LCT Stream Buffer and an ALC/LCT Stream Parser and after buffering the ALC/LCT structure data outputted from the UDP Datagram Handler 138, analyzes the header and the header extension of the ALC/LCT session buffered from the data. After analyzing the header and the header extension of the ALC/LCT session, if the data transmitted through ALC/LCT session is in XML structure then it is outputted to the XML Parser 153, and if the data is in file structure, it is temporarily stored in the File Reconstruction Buffer 152 and outputted to the File Decoder 157 or stored in the third storage unit 156. If the data transmitted through ALC/LCT session is data for NRT service, the ALC/LCT stream handler 151 gets controlled by the NRT service manager 210. If the data transmitted through ALC/LCT session is compressed, the Decompressor 155 decompresses and outputted to the XML Parser 153, the File Decoder 157, or the third storage unit 156.

The XML Parser 153 analyzes the XML data transmitted through ALC/LCT session and if the analyzed data is filed-based service then it is outputted to the FDT Handler 154 and if it is a data for service guide, then it is outputted to the SG Handler 190.

The FDT Handler 154 analyzes and processes the File Description Table of the FLUTE protocol through the ALC/LCT session. The FDT Handler 154 is controlled by the NRT Service Manager 210 if the received file is for the NRT service.

The SG Handler 190 gathers and analyzes the data for the service guide transmitted in XML structure, and then outputs to the EPG Manager 200.

The File Decoder 157 decodes the file outputted from the File Reconstruction Buffer 152, file outputted from the Decompressor 155, or filed uploaded from the third storage unit 156 using the pre-selected algorithm and outputs to the Middleware (M/W) Engine 230 or to the A/V Decoder 141.

The M/W Engine 230 interprets and executes the application, which is the data of the file structure. Further, through the Presentation Manager 240, the application may be outputted to an output device such as a screen or a speaker. In an embodiment, the M/W Engine 230 is a JAVA platform based M/W Engine.

The EPG Manager 200, depending upon the input from the user, outputs the service guide data after converting into a display format received from the SG Handler 190 to the Presentation Manager 240. The Application Manager 220 manages the handling of the application data received in a file format.

The Service Manager 160 gathers and analyzes the NRT service signaling data transmitted through the NRT service signaling channel or the PSI/PSIP table data and creates a service map and the stores in the second storage unit 125. The Service Manager 160 controls the access information of the NRT service that the user wants and controls the Tuner 111, Demodulator 112, and the IP Datagram Handler 136.

The Operation Controller 100 according to the command from the user through the UI Manager 250, controls at least one of the Service Manager 160, the PVR Manager 170, the EPG Manager 200, the NRT Service Manager 210, the Application Manager 220, and the Presentation Manager 240, and executes the user's command.

The NRT Service Manager 210 manages the NRT Service transmitted in content/file format through the FLUTE session on the IP layer.

The UI Manager 250 delivers the user's input through the UI to the Operation Controller 100.

The Presentation Manager 240 provides the user through a speaker and/or a screen at least one of the audio and video data outputted from the A/V Decoder 141, file data outputted from the M/W Engine 230, or service guide data outputted from the EPG Manager 210.

Meanwhile, according to the embodiment of the present invention, when an entry file is included in a single content item, the FDT is used to signal information on the entry file, as shown in FIG. 10 or FIG. 11. In this case, the FDT handler 154 analyzes the corresponding FDT XML schema, so as to acquire the information on the entry file. The acquired information on the entry file may be stored in one of the first to third storages 125, 180, and 156. And, reference is made to the stored information on the entry file when the respective content item is executed, or when the respective content item is stored and then played-back.

In the present invention, one or more files included in a single content item may be compresses to a ZIP file and transmitted. At this point, according to the embodiment of the present invention, when an entry file is included in the ZIP file, entry file information is signaled by using an entry file descriptor or by using a header of the corresponding ZIP file. Also, according to the embodiment of the present invention, the entry file descriptor is included as a content level descriptor of the respective NRT-IT.

If the entry file information is signaled to the entry file descriptor and transmitted, the NRT service manager 210 (or the service manager 160) analyzes the entry file descriptor included in the NRT-IT, thereby acquiring the entry file information. The acquired entry file information may be stored in one of the first to third storages 125, 180, and 156. And, reference is made to the stored entry file information when the respective content item is executed, or when the respective content item is stored and then played-back.

If the entry file information is signaled to the header of the corresponding ZIP file and transmitted, the file decoder 157 analyzes the header of the corresponding ZIP file, thereby acquiring the entry file information. Then, the acquired entry file information may be stored in one of first to third storages 125, 180, and 156. And, reference is made to the stored entry file information when the respective content item is executed, or when the respective content item is stored and then played-back.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

The invention claimed is:

1. A method of processing a non-real time (NRT) service in a broadcast receiver, the method comprising:

receiving signaling information including a NRT information table describing content items available for download to storage in the broadcast receiver, wherein the NRT information table includes access information which indicates files of a content item among the content items can be accessed by Internet and content linkage information which links metadata in the NRT information table to the files in a File Delivery over Unidirectional Transport (FLUTE) File Delivery Table (FDT), wherein the FLUTE FDT describes linkages between the files;

receiving the files through FLUTE sessions based on information in the FLUTE FDT, wherein FLUTE FDT includes content location information specifying locations of the files, and entry file information indicating an entry file among the files, wherein the entry file is to be accessed first before accessing other files of the files for the content item; and providing the NRT service using the files of the content item, wherein the NRT information table further includes an expiration_included field specifying whether an expiration field is included in an iteration of for_loop in the NRT information table, wherein the NRT information table further includes the expiration field representing an expiration time of the content item, wherein the signaling information further includes purchase option information specifying purchasing types for the content items when the content items correspond to purchase content items, wherein the signaling information further includes price information specifying costs of purchases for the content items, wherein the signaling information further includes currency information specifying currencies used to set the costs of the purchases, and wherein the signaling information comprises an NRT content delivery channel descriptor.

2. The method of claim 1, wherein the signaling information includes a descriptor including the information on the entry file, and wherein the information on the entry file includes a file name of the entry file.

3. The method of claim 1, wherein the signaling information includes NRT service signaling table, NRT service map table, and NRT information table.

4. The method of claim 1, wherein the files are accessed by using absolute tag URL or relative URL.

5. The method of claim 4, wherein when the files are accessed using absolute tag URL, that URL is an absolute URL for the files.

6. The method of claim 5, wherein the absolute tag URL is to be globally unique and determined in the FLUTE session.

7. The method of claim 4, wherein when the files are accessed using relative URL, the files have URLs of form file://X/<content-location>, where X is an arbitrary virtual folder known to the broadcast receiver.

8. The method of claim 1, wherein the FLUTE files that are not available over the Internet have either a relative URL or an absolute tag Uniform Resource Identifier (URI) as the content location value.

9. A broadcast receiver to process a non-real time service, the broadcast receiver comprising:
a signaling information processor for receiving signaling information including a NRT information table describing content items available for download to storage in the broadcast receiver, wherein the NRT information table includes access information which indicates files of a content item among the content items can be accessed by Internet and content linkage information which links metadata in the NRT information table to the files in a File Delivery over Unidirectional Transport (FLUTE) File Delivery Table (FDT), wherein the FLUTE FDT describes linkages between the files;
a file processor for receiving the files through FLUTE sessions based on information in the FLUTE FDT,
wherein FLUTE FDT includes content location information specifying content locations of the files, and entry file information indicating an entry file among the files, wherein the entry file is to be accessed first before accessing other files of the files for the content item; and
a service processor for providing the NRT service using the files of the content item,
wherein the NRT information table further includes an expiration_included field specifying whether an expiration field is included in an iteration of for_loop in the NRT information table,
wherein the NRT information table further includes the expiration field representing an expiration time of the content item,
wherein the signaling information further includes purchase option information specifying purchasing types for the content items when the content items correspond to purchase content items,
wherein the signaling information further includes price information specifying costs of purchases for the content items,
wherein the signaling information further includes currency information specifying currencies used to set the costs of the purchases, and
wherein the signaling information comprises an NRT content delivery channel descriptor.

10. The broadcast receiver of claim 9, wherein the signaling information includes a descriptor including the information on the entry file, and wherein the information on the entry file includes a file name of the entry file.

11. The broadcast receiver of claim 9, wherein the signaling information includes NRT service signaling table, NRT service map table, and NRT information table.

12. The broadcast receiver of claim 9, wherein the files are accessed by using absolute tag URL or relative URL.

13. The broadcast receiver of claim 9, wherein when the files are accessed using absolute tag URL, that URL is an absolute URL for the files.

14. The broadcast receiver of claim 13, wherein when the files are accessed using relative URL, the files have URLs of form file://X/<content-location>, where X is an arbitrary virtual folder known to the broadcast receiver.

15. The broadcast receiver of claim 13, wherein the absolute tag URL is to be globally unique and determined in the FLUTE session.

16. The broadcast receiver of claim 9, wherein the FLUTE files that are not available over the Internet have either a relative URL or an absolute tag Uniform Resource Identifier (URI) as the content location value.

* * * * *